(12) United States Patent
De Gaudenzi et al.

(10) Patent No.: US 9,900,070 B2
(45) Date of Patent: Feb. 20, 2018

(54) METHOD AND APPARATUS FOR TRANSMITTING DATA PACKETS OVER A TRANSMISSION CHANNEL SHARED BY A PLURALITY OF USERS

(71) Applicant: EUROPEAN SPACE AGENCY, Paris (FR)

(72) Inventors: Riccardo De Gaudenzi, The Hague (NL); Oscar Del Rio Herrero, Leiden (NL)

(73) Assignee: EUROPEAN SPACE AGENCY, Paris (FR)

( * ) Notice: Subject to any disclaimer, the term of this patent is extended or adjusted under 35 U.S.C. 154(b) by 144 days.

(21) Appl. No.: 14/899,487

(22) PCT Filed: Jul. 3, 2013

(86) PCT No.: PCT/EP2013/064082
§ 371 (c)(1),
(2) Date: Dec. 17, 2015

(87) PCT Pub. No.: WO2015/000518
PCT Pub. Date: Jan. 8, 2015

(65) Prior Publication Data
US 2016/0149627 A1    May 26, 2016

(51) Int. Cl.
*H04B 7/06* (2006.01)
*H04W 4/00* (2018.01)
(Continued)

(52) U.S. Cl.
CPC .......... *H04B 7/0615* (2013.01); *H04W 4/005* (2013.01); *H04W 74/0833* (2013.01); *H04L 1/0048* (2013.01); *H04W 72/0446* (2013.01)

(58) Field of Classification Search
None
See application file for complete search history.

(56) References Cited

U.S. PATENT DOCUMENTS 5,745,582 A       4/1998  Shimpuku et al.
2002/0118661 A1*  8/2002  Voce ................. H04W 74/0841
                                                                370/337
(Continued)

FOREIGN PATENT DOCUMENTS

DE      102011011397 B3    6/2012
EP         2159926 A1      3/2010

OTHER PUBLICATIONS

Mar. 23, 2017 Office Action issued in European Patent Application No. 13 734 734.0.

(Continued)

*Primary Examiner* — Chi H Pham
*Assistant Examiner* — Soon-Dong D Hyun
(74) *Attorney, Agent, or Firm* — Oliff PLC

(57) ABSTRACT

A method of transmitting data packets over a transmission channel shared by transmitters on the basis of a first unit of transmission of fixed length subdivided into second units of transmission of fixed length, includes: associating, at a first transmitter, for each packet to be transmitted at least two packet replicas with respective second units within a current first unit; generating, at the first transmitter, the replicas, in each of which signaling information is included, the signaling information indicating relative positions of the other replicas of the same packet within the current first unit with respect to the given replica; setting, at the first transmitter, a start timing for beginning transmission of the current first unit independently of the other transmitters of the transmitters sharing the transmission channel; and transmitting the replicas at respective timings in accordance with their association with the respective second units within the current first unit.

38 Claims, 28 Drawing Sheets

(51) Int. Cl.
*H04W 74/08* (2009.01)
*H04L 1/00* (2006.01)
*H04W 72/04* (2009.01)

(56) References Cited

U.S. PATENT DOCUMENTS

| 2005/0054288 | A1* | 3/2005 | Agarwal | H04B 7/18513 |
| | | | | 455/13.1 |
| 2005/0174983 | A1* | 8/2005 | Naguleswaran | H04B 1/10 |
| | | | | 370/347 |
| 2006/0171418 | A1 | 8/2006 | Casini et al. | |
| 2006/0215617 | A1* | 9/2006 | Martin | H04B 7/212 |
| | | | | 370/337 |
| 2008/0247352 | A1* | 10/2008 | Martin | H04B 7/2681 |
| | | | | 370/319 |
| 2010/0054131 | A1 | 3/2010 | del Rio Herrero et al. | |
| 2010/0135274 | A1* | 6/2010 | Hong | H04B 7/2656 |
| | | | | 370/345 |
| 2011/0028087 | A1* | 2/2011 | Avellan | H04B 7/18513 |
| | | | | 455/12.1 |
| 2013/0279334 | A1* | 10/2013 | Xu | H04W 24/04 |
| | | | | 370/235 |

OTHER PUBLICATIONS

Clazzer, Federico et al. "Enhanced Contention Resolution Aloha—ECRA," 9th International ITG Conference on Systems, Communication and Coding, 2012.
Kissling, Christian. "Performance Enhancements for Asynchronous Random Access Protocols over Satellite," PROC. of 2011 International Communication Conference, 2011.
Casini, Enrico et al. "Contention Resolution Diversity Slotted ALOHA (CRDSA): An Enhanced Random Access Scheme for Satellite Access Packet Networks," IEE Transaction on Wireless Communications, vol. 6, No. 4, pp. 1408-1419, 2007.
Mar. 24, 2014 Search Report issued in International Patent Application No. PCT/EP2013/064082.
Abramson, Norman. "The Aloha System—Another alternative for computer communications," AFIPS Conference Proceedings, vol. 37, pp. 281-285,1970.
Roberts, L.G. "ALOHA Packet System with and without Slots and Capture," ARPANET System note 8 (NIC11290), pp. 28-42, 1972.
Chouldhury, Gagan L. et al. "Diversity ALOHA—A Random Access Scheme for Satellite Communications," IEEE Transactions on Communications, vol. COM-31, No. 3, pp. 450-457, 1983.
Herrero, Oscar del Río et al. "A High-Performance MAC Protocol for Consumer Broadband Satellite Systems," 27th AIA International Communications Satellite Systems Conference Proceedings, 2009.
Herrero, Oscar del Río et al. "Generalized Analytical Framework for the Performance Assessment of Slotted Random Access Protocols," IEEE Transactions of Wireless Communications, vol. 13, No. 2, pp. 809-821, 2014.
Herrero, Oscar del Río et al. "High Efficiency Satellite Multiple Access Scheme for Machine-to-Machine communications," IEEE Transactions on Aerospace and Electronic Systems, vol. 48, No. 4, pp. 2961-2989, 2012.
Jan. 5, 2016 International Preliminary Report on Patentability issued in International Patent Application No. PCT/EP2013/064082.
Hall, Philip. "The Distribution of Means of Samples of Size N Drawn From a Population in Which The Variate Takes Values Between 0 and 1, All Such Values Being Equally Probable.", Biometrika, vol. 19, pp. 240-245, (1927).
Irwin, J.O., "On the Frequency Distribution of the Means of Samples From a Population Having Any Law of Frequency With Finite Moments, With Special Reference to Pearson's Type II.", Biometrika, vol. XIX, (1927), pp. 225-239.
Digital Video Broadcasting (DVB); Second Generation DVB Interactive Satellite System (DVB-RCS2); Part 2: Lower Layers for Satellite Standard, ETSI EN 301 545-2 V1.1.1, (2011).

* cited by examiner

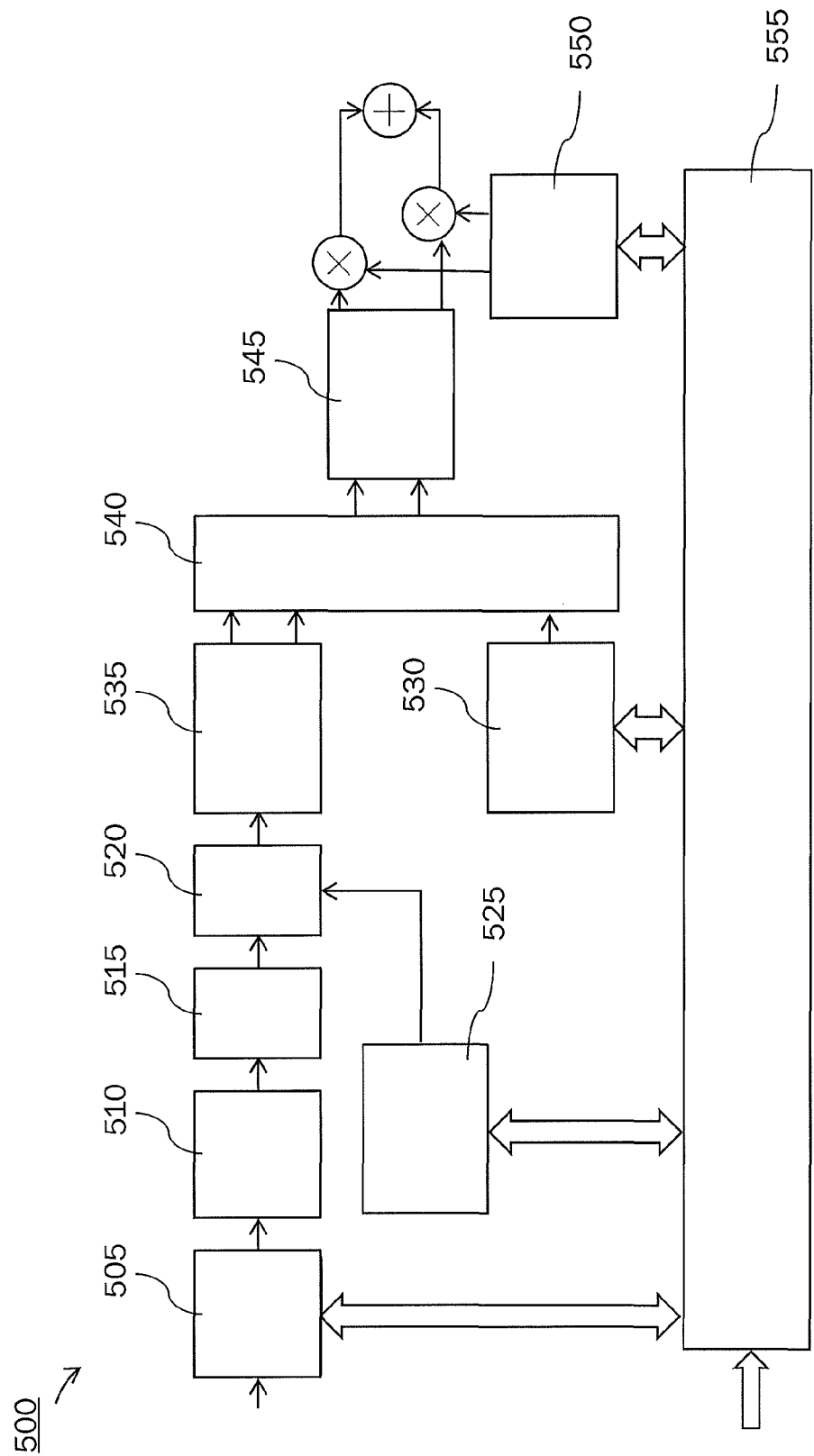

FIG. 13A  ACRDA 2 replicas, $E_s/N_0$=10 dB, QPSK, FEC 1/3, 15 IC iterations, 100 slots/frame
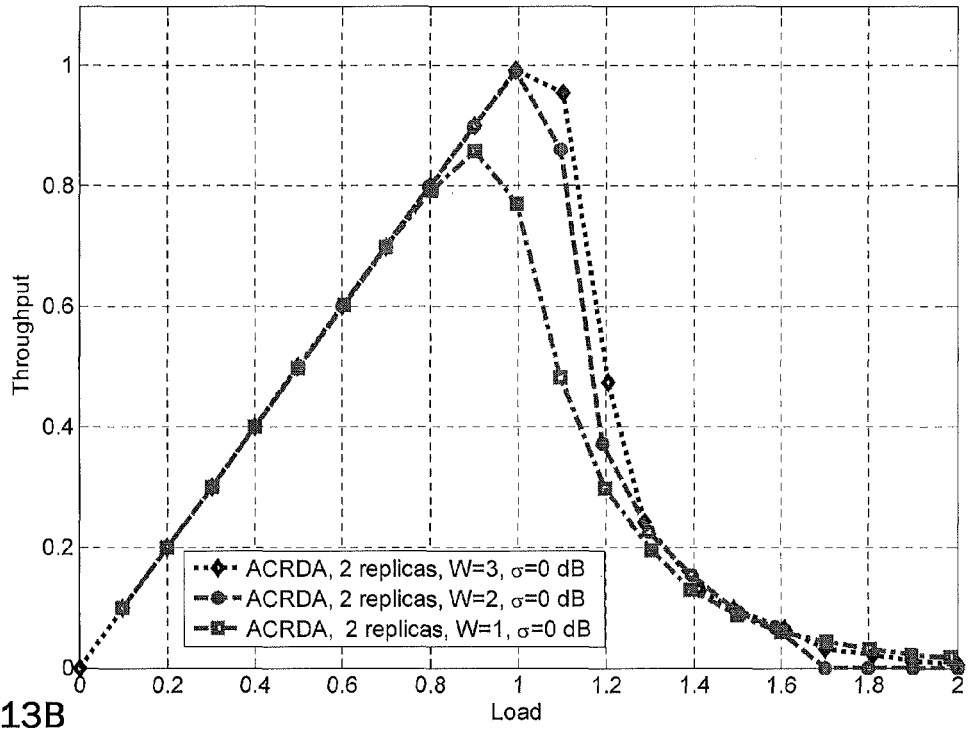
FIG. 13B  ACRDA 2 replicas, $E_s/N_0$=10 dB, QPSK, FEC 1/3, 15 IC iterations, 100 slots/frame
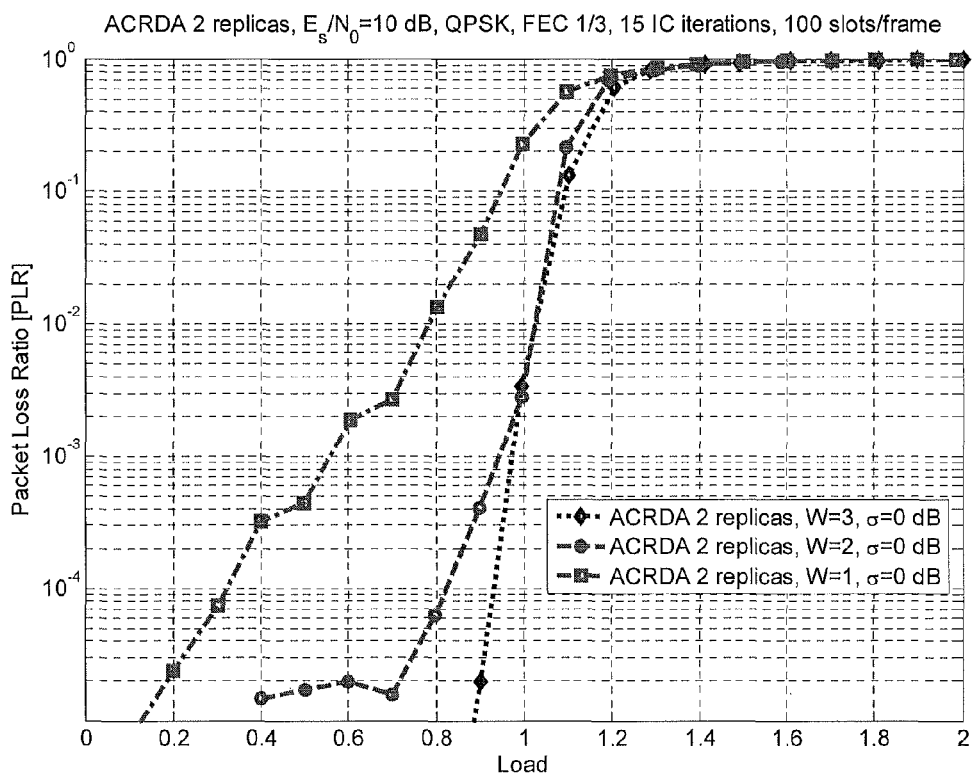

FIG. 19
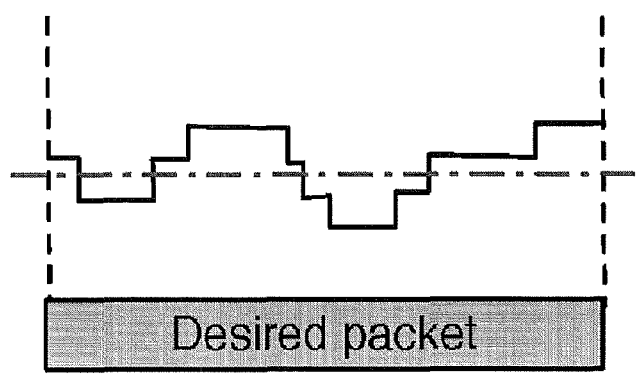
FIG. 20
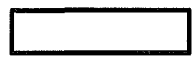
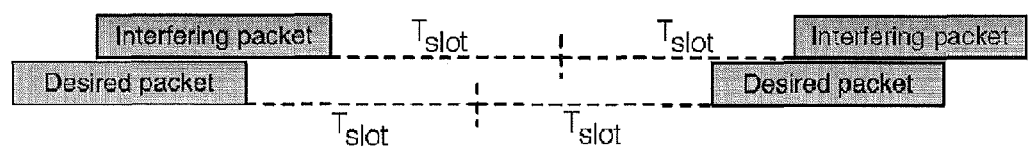

METHOD AND APPARATUS FOR TRANSMITTING DATA PACKETS OVER A TRANSMISSION CHANNEL SHARED BY A PLURALITY OF USERS

TECHNICAL FIELD OF THE INVENTION

The present invention relates to a method of packet mode digital communication over a transmission channel shared by a plurality of users. In particular, it seeks to allow for scalability of packet mode digital communication systems and increasing the possible maximum number of users sharing the communication channel.

Particularly, though not exclusively, the invention is applicable to packet mode digital communication with low duty cycle for mobile applications, including Supervisory Control and Data Acquisition (SCADA), Machine-to-Machine (M2M) communication, broadband access networks, mobile satellite networks and Air Traffic Management (ATM) networks. Applications to terrestrial wireless networks are also possible.

BACKGROUND OF THE INVENTION

There is a growing interest to enhance the performance of random access (RA) protocols suitable to support low-cost interactive satellite and terrestrial terminals for the fixed broadband consumer market and mobile applications, including M2M communications. A number of RA techniques that are able to largely increase the performance of the conventional Slotted ALOHA (SA) and Diversity Slotted ALOHA (DSA) protocols have been proposed over the last few years.

The ALOHA protocol is a random access protocol developed in 1970. The basic principle is simple: each user transmits data independently of the other users and awaits an acknowledgement from the receiver. If no acknowledgement is received, the user retransmits the same data with a random delay, and this procedure continues until the data is received correctly and acknowledged by the receiver. Obviously, if two or more users transmit simultaneously, an access conflict arises, in other words a collision, which may entail the loss of the transmitted data (this is known as a "destructive" collision). For this reason, the system can function only if the utilization coefficient of each user (the fraction of the time actually used for transmission) is low. Statistical analysis shows that the maximum normalized bit rate that can be obtained is of the order of only 18%. That maximum bit rate is obtained when the number of attempts to transmit packets of unit duration per unit time is equal to 0.5. For a discussion of the original ALOHA protocol cf. N. Abramson, "The Aloha System—another Alternative for Computer Communications", AFIPS Conf. Proc. Vol. 37, pp. 281-285, 1970.

The SA protocol is a variant of the original ALOHA protocol that doubles the maximum bit rate compared to the above situation, so that a normalized bit rate of the order of 36% is obtained when the number of attempts to transmit packets of unitary duration per unit time is equal to 1. This improvement in service is obtained by synchronizing users, dividing time into slots of predetermined duration (for example equal to the transmission time of a data packet), and transmitting the packets in corresponding relationship to said slots. The SA protocol is discussed e.g. in L. G. Roberts "ALOHA Packet Systems with and without Slots and Capture", ARPANET System note 8 (NIC11290), June 1972.

The basic principle of the DSA protocol introduced in Gagan L. Chouldhury and Stephen S. Rappaport "Diversity ALOHA-A Random Access Scheme for Satellite Communications", IEEE Transactions on Communications, vol. COM-31, No. 3, March 1983 is to transmit k>1 replicas of each packet, either with a random time shift (in Time Division Multiple Access (TDMA) systems), or simultaneously on channels of different frequency (in Frequency Division Multiple Access (FDMA) systems). It is shown that by choosing the value of k appropriately it is possible to improve the performance of the SA protocol, as much in terms of capacity as of transmission delay, in particular if the system is not heavily loaded (less than one transmission attempt per unit time).

Throughput in the SA/DSA schemes has been shown to be significantly increased by a scheme referred to as Contention Resolution Diversity Slotted ALOHA (CRDSA). This scheme is discussed in E. Casini, R. De Gaudenzi and O. del Rio Herrero, "Contention Resolution Diversity Slotted Aloha (CRDSA): an Enhanced Random Access Scheme for Satellite Access Packet Networks", IEEE Transactions on Wireless Communications, vol. 6, no. 4, pp. 1408-1419, April 2007, as well as in laid open US patent application US 2006/0171418 A1. Particularly, it has been shown how the SA/DSA throughput can be significantly increased by a relatively simple extension of the DSA concept together with iterative interference cancellation at the demodulator side. The CRDSA performance with two replicas can be enhanced by using more than two replicas so as to reduce the probability of the so-called "loop" phenomenon (cf. O. del Río Herrero, R. De Gaudenzi, "A High-Performance MAC Protocol for Consumer Broadband Satellite Systems", In the Proc. of 27th AIM International Communications Satellite Systems Conference, Jun. 1-4, 2009, Edinburgh (United Kingdom), and O. del Río Herrero, R. De Gaudenzi, "Generalized Analytical Framework for the Performance Assessment of Slotted Random Access Protocols", submitted to IEEE Trans. on Wireless Comm., 2013).

The concept of CRDSA has been further extended to encompass an irregular repetition CRDSA scheme which is dubbed Irregular Repetition Slotted ALOHA (IRSA). Therein, bipartite graphs theory, which is typically used in the design and analysis of Forward Error Correcting (FEC) schemes, has been exploited in order to design the optimized irregular packet repetition scheme. Although the proposed scheme exhibit some throughput increase compared to CRDSA with two replicas, its performance at the typical Packet Loss Ratio (PLR)$\leq 10^{-3}$ does not appear very attractive when compared to CRDSA with three to four replicas. Furthermore, the randomization of the number of packet replicas in each frame complicates the transmitter-side RA scheme implementation and the associated signaling mechanism.

The second generation Digital Video Broadcasting Return Channel by Satellite (DVB-RCS2) standard (cf. Digital Video Broadcasting (DVB); Second Generation DVB Interactive Satellite System; Part 2: Lower Layers for Satellite standard ETSI EN 301 545-2 V1.1.1 (2012-01)) optionally supports CRDSA on the return link for both data and signaling traffic.

However, for all of the above modifications of the original ALOHA protocol, such as SA, DSA, CRDSA and IRSA the need for terminal synchronization is a major drawback for large networks as the signaling overhead scales up with the number of terminals independently from their traffic activity factor. In particular, also terminals that are not active need to be kept in synchronization with the shared receiver, thereby causing an increased signaling overhead.

A first contribution in relaxing the synchronization accuracy for slotted RA has been provided by a RA scheme dubbed Contention Resolution ALOHA (CRA), which is discussed in C. Kissling, "Performance Enhancements for Asynchronous Random Access Protocols over Satellite", In the Proc. of 2011 International Communication Conference, ICC 2011, Jun. 5-9, 2011, Kyoto, Japan, pp. 1-6. The key idea behind CRA is to remove the notion of common slots for packet transmission inside the CRDSA or IRSA frames allowing the replica packet(s) from individual terminals to be transmitted with a random delay (and possibly different duration) within the frame boundaries.

The main motivation for CRA is three-fold: relaxing the required terminal timing synchronization accuracy with respect to the network reference, avoiding the CRDSA packet limitations related to the CRDSA slotted nature, and exploiting partial packet overlap occurring due to the random transmission time within the frame boundaries which can enhance the collision resolution process compared to a pure slotted RA scheme even in the absence of power unbalance.

However, CRA does not eliminate the need for terminal timing synchronization with the network reference. Moreover, CRA has a number of negative implications that seem to overshadow the advantages with regard to avoiding the CRDSA packet size limitations. Lastly, the attempt to exploit the partial packets overlap can be shown to rather relate mainly to a reduction in the loop occurrence probability. It should also be remarked that when comparing the results obtained for CRDSA with coding rate ⅓ and three replicas to the results obtained for CRA with three replicas, it is apparent that CRDSA outperforms CRA.

In the following, the CRA scheme will be critically reviewed in more detail. Concerning the CRA relaxation of the timing requirements, it is true that CRA has less stringent timing synchronization requirements than CRDSA. This is because in CRA the terminal shall be synchronized at frame level rather than at slot level. However, CRA does not eliminate the need for central time synchronization for user terminals, which is one of the main drawbacks of CRDSA or its derivatives.

Also the avoidance of packet size limitations by CRA thanks to the removal of the frame slots notion is considered an advantage of limited practical value. This is because for signaling the packet length to the receiver, a separate heavily coded field for indicating the packet type will be required. In addition, as the location of the replicas is not anymore in a specified frame slot location, a much higher number of bits are required to signal the replica packets' location within the frame. As a consequence, the amount of signaling that is required by CRA is much higher than in CRDSA.

As noted above, the CRA claimed performance improvement compared to CRDSA is related to the loop probability mitigation rather than the partial packet overlap interference mitigation increasing the number of resolved packet collisions. As it turns out there is no statistical advantage in performance due to the partial packet overlap.

Another approach which has been pursued is to enhance the performance of packet-based Spread-Spectrum ALOHA (SSA) RA by adopting packet oriented iterative interference cancellation. This scheme, which is referred to as Enhanced SSA (E-SSA) is described in O. del Rio Herrero, R. De Gaudenzi, "High Efficiency Satellite Multiple Access Scheme for Machine-to-Machine Communications", IEEE Trans. on Aerospace and Electronic Systems, Vol. 48, No. 4, October 2012, pp. 2961-2989 as well as in laid open European patent application EP 2 159 926 A1 and laid open US patent application US 2010/0054131 A1. E-SSA outperforms CRDSA for two main reasons: avoidance of transmission of packet replicas thanks to the direct-sequence spreading sequence "isolation" mitigating the other packets' collision impact and higher traffic aggregation achieved by using spreading techniques which largely reduces the fluctuation in the number of received packets for a given Poisson traffic load.

On the other hand, E-SSA has the disadvantage that due to application of the spread spectrum technique it requires a wider frequency band than CRDSA and that, moreover, it is not easily deployable in legacy Multi-Frequency TDMA (MF-TDMA) networks.

Summarizing, up to date there is lack of a transmission protocol for unslotted non spread-spectrum packet mode digital communication with a low duty cycle traffic profile that would allow for providing a scalable communication system with a shared communication channel.

SUMMARY OF THE INVENTION

It is an object of the present invention to overcome the limitations of the prior art discussed above. It is another object of the invention to improve scalability in packet mode digital communication over a transmission channel shared by a plurality of users. It is another object of the invention to reduce the signaling overhead in packet mode digital communication over a transmission channel shared by a plurality of users.

In view of the above objects, the invention proposes a method of transmitting data packets over a transmission channel shared by a plurality of transmitters, a method of recovering data packets transmitted over a transmission channel shared by a plurality of transmitters, an apparatus for recovering data packets transmitted over a transmission channel shared by a plurality of transmitters, a system of a plurality of transmitters sharing a transmission channel, and a transmitter having the features of the respective independent claims. Preferred embodiments of the invention are defined in the dependent claims.

According to an aspect of the invention, a method of transmitting data packets over a transmission channel shared by a plurality of transmitters, wherein transmission proceeds on the basis of a first unit of transmission of fixed length that is subdivided into a plurality of second units of transmission of fixed length, comprises: a) associating, at a first transmitter, for each packet to be transmitted at least two replicas of the packet with respective second units of transmission within a current first unit of transmission; b) generating, at the first transmitter, the at least two replicas, wherein in each of the at least two replicas signaling information is included, the signaling information indicating relative positions of the other replicas of the same packet within the current first unit of transmission with respect to the given replica; c) setting, at the first transmitter, a start timing for beginning transmission of the current first unit of transmission independently of the other transmitters of the plurality of transmitters sharing the transmission channel; and d) transmitting the at least two replicas at respective timings in accordance with their association with the respective second units of transmission within the current first unit of transmission.

Preferably, in c) the start timing is set a predetermined or random duration after generation of the at least two replica at b) has been completed. Further preferably, in c) the start timing is set without synchronization with a shared receiver associated with the communication channel. Yet further preferably, in c) the start timing is set such that there may occur a situation in which, at a time of reception at a shared receiver associated with the communication channel, an offset in the time domain between the current first unit of transmission and a first unit of transmission transmitted by a second transmitter of the plurality of transmitters is not an integer multiple of the length of the first unit of transmission.

Accordingly, at the transmitter level, transmission is performed on the basis of virtual frames (VF; first units of transmission). All virtual frames are composed of a known and fixed number of slots (second units of transmission) of fixed and known duration (length). Accordingly, also the duration (length) of the virtual frames is fixed and known. When the packet to be transmitted is generated at the terminal (i.e. transmitter) side the randomly generated slot location of the replicas is known. Each replica contains low-overhead information about its respective location in terms of relative shifts compared to other replicas. A gateway demodulator is able to accurately recover the packet symbol clock timing as well as the packet start time identified by the preamble of each replica. With the knowledge of how many symbols are contained in the slot the locations of packet replicas can be easily reconstructed.

By performing transmission on the basis of virtual frames, transmission of which is performed such that it starts at a timing that has been set independently of other transmitters, the present invention allows for truly asynchronous access to the shared communication channel, while keeping replica signaling and modulator processing very close to that of CRDSA. Evidently, this measure removes the need for user terminal timing synchronization. Thus, by contrast to CRDSA, which requires relatively tight user terminal timing synchronization (symbol level), the present invention does not require any slot timing synchronization across transmitters or between a transmitter and a shared receiver. This beneficially translates into lower system complexity, lower overall signaling traffic, and a simplified modulator in comparison to that of CRDSA. In other words, the fact that the present invention does not require slotted access and associated timing synchronization loop implementation has a positive impact on the user terminal and overall system implementation complexity. As a result, scalability (with respect to the number of users) of packet mode digital communication over a transmission channel shared by a plurality of users can be greatly improved.

Also, the inventive operation in a truly asynchronous mode does not come with the need for adopting direct-sequence spread-spectrum as is the case in SSA and E-SSA in order to allow for contention resolution. Similarly to CRDSA, the present invention solves packet collisions by means of time and/or power/carrier frequency diversity so that it only requires a narrow available frequency band compared to SSA and E-SSA. Thus, by contrast to SSA or E-SSA, the present invention may be deployed in legacy MF-TDMA networks in a simple manner.

In addition to reducing the signaling overhead, by performing truly asynchronous transmission the present invention achieves throughput performance for two replicas and given PLR that is superior to CRDSA and delay performance that is decidedly better than that of CRDSA.

At the same time, the present invention preserves a slotted nature within a virtual frame which is only local to the transmitter. Thereby, the present invention elegantly solves the issue of preserving slotted transmission as required by CRDSA so that it enables its deployment in legacy MF-TDMA networks.

Moreover, the present invention allows reducing the transmission latency compared to the CRDSA scheme. By virtue of the asynchronous nature of random access to the shared communication channel, transmission of a virtual frame can start as soon as encoding of the replicas is completed. This is in clear contrast to CRDSA, and other slotted schemes, in which the start of the frame is determined centrally, which in general results in a delay of transmission of the frame.

A further result of the asynchronous nature of transmission achieved by the present invention lies in a reduction of the loop occurrence probability. The loop phenomenon is basically related to the occurrence of collisions between all of the replicas of the same packet and respective other replicas of different packets, thus leading to un-resolvable collision situations. Therein, the loop probability occurrence is rapidly decaying with the number of replicas per packet to be transmitted, which explains why for CRDSA the best performance is obtained for three or even four replicas despite the associated increase of physical layer packets fed into the shared transmission channel. However, as the inventors have realized, the asynchronous nature of the incoming packets at the gateway demodulator greatly mitigates the probability of loop occurrences, so that the present invention can achieve high throughput at low PLR with a lower number of replicas. Thus, for an equal number of replicas and equal throughput, the PLR that is achievable by the present invention is significantly lower than that of CRDSA.

It is further preferred that the signaling information indicates the relative positions of the other replicas of the same packet with respect to the given replica in terms of an integer number of second units of transmission.

If each packet replica contains locations of other replicas of the same packet with respect to the respective replica location expressed as an integer number of slots, the signaling overhead for indicating the positions of other replicas of the same packet does not rise above that of CRDSA.

A particular advantage is achieved if in b) exactly two replicas are generated.

As the inventors have realized, due to the reduced loop occurrence probability achieved by the present invention, now two replicas are sufficient in order to obtain an acceptable PLR. Transmitting only two replicas per packet to be transmitted implies a corresponding reduction in the complexity of the gateway demodulator which is almost proportional to the number of packet replicas to be processed. Thus, gateway modulator complexity is reduced by at least a third compared to CRDSA. The reduction of the number of replicas also allows for a reduction in the time the transmitter is transmitting, thus increasing the energetic efficiency of the inventive transmission scheme.

Preferably, the method further comprises setting a power of transmission for the current first unit of transmission in accordance with a randomization scheme, wherein in d) transmission of all replicas that are associated with second units of transmission of the current first unit of transmission is performed in accordance with the power of transmission. Thus, the power of transmission is a VF unique randomized power of transmission. Alternatively, the method further comprises, for each of the generated replicas, setting a power of transmission in accordance with a randomization scheme, so that when there are $N_{rep}$ generated replicas, $N_{rep}$ independent powers of transmission are set, wherein in d) transmission of each of the $N_{rep}$ generated replicas is performed in accordance with the respective one of the $N_{rep}$ independent powers of transmission.

By randomly setting the transmission power on a frame-by-frame basis, or on a slot-by slot basis, a probability is increased that of two or more replicas that collide in the demodulator, one has a higher power and therefore may be decoded correctly. When combined with an interference cancellation scheme on the demodulator side, transmission power randomization thus leads to an increased decoding efficiency, and thus to a decreased PLR and loop occurrence probability.

It is of particular advantage if in a) a first one of the two or more replica is associated with the earliest second unit of transmission within the current first unit of transmission.

Accordingly, the first packet replica can be sent at the beginning of the virtual frame, thereby further reducing the transmission delay and latency. Evidently, such positioning the first replica in the first slot of a frame would not be feasible in the CRDSA and similar schemes, since it would result in a drastic increase of collision probability.

Alternatively, in a) a first one of the two or more replica may be associated with a second unit of transmission within the current first unit of transmission in accordance with a congestion control policy.

According to another aspect of the invention, a method of recovering data packets transmitted over a transmission channel shared by a plurality of transmitters by the inventive method of transmitting data packets comprises: a) storing signal samples obtained in order from a received signal in a processing memory which is of FIFO type and which has an entry side and an exit side, wherein a length of the processing memory corresponds to a length in the time domain that is larger than the length of the first unit of transmission; b) sequentially scanning the processing memory for identifying and decoding replicas in the processing memory that are not affected by destructive collisions with replicas of other packets, locating other replicas of the same packet by using the signaling information included in the decoded replicas, performing interference cancellation by cancelling the located other replicas from the processing memory, and identifying and decoding other replicas which, after the interference cancellation, are no longer affected by destructive interference; c) shifting the signal samples stored in the processing memory by a predetermined number of signal samples towards the exit side of the processing memory, so that at the exit side of the processing memory the predetermined number of signal samples are discarded, and adding a corresponding number of signal samples, that have been obtained in order, on the entry side of the processing memory, wherein the predetermined number of signal samples corresponds to a length in the time domain that is smaller than the length of the first unit of transmission; and d) performing b) again on the signal samples stored in the processing memory after performing c).

By implementing this method for recovering packets (demodulation), an incoming signal comprising asynchronously transmitted virtual frames can be demodulated in a simple manner. Therein, at a first glance it might appear as if the inventive method was affected by a larger latency than that according to the CRDSA scheme because of the presence of the window memory in the demodulator which is increasing the decoding delay. However, this supposed disadvantage is more than counterbalanced by the fact that transmission of the virtual frames can start as soon as the packet replicas are ready to be transmitted thanks to the RA asynchronous nature of transmission in the inventive scheme. Also the fact that demodulation according to the inventive scheme requires a processing memory size which is larger than a virtual frame (and thus larger than that of CRDSA) is considered to be of minor importance since memory size is by far not as critical as the signal processing complexity.

Thus, demodulation according to the present invention allows handling asynchronous packets transmission without increasing the complexity on the demodulator side, and thereby allows exploiting the various advantages of the inventive transmission method discussed above.

By performing interference cancellation on the packet-by-packet base, the inventive method enjoys the advantages of DSA, i.e. transmission of multiple replicas per packet to be transmitted, to the fullest extent. In this sense, it can be said that the present invention advantageously combines the advantages of packet-by-packet interference cancellation with truly asynchronous transmission.

Preferably, the length of the processing memory corresponds to more than two times the length of the first unit of transmission. Further preferably, the length of the processing memory corresponds to less than or equal to three times the length of the first unit of transmission.

As the present inventors have found out, optimum results with regard to throughput and PLR are achieved for the above choice of the length of the processing memory. A particularly preferred choice for the length of the processing memory is three times the length of the first unit of transmission.

The method may further comprise: storing, if one of the one or more other replicas located in b) is not fully stored in the processing memory, the decoded data of the decoded replica in a memory and cancelling interference by the respective one of the other replicas when the respective one of the other replicas is fully stored in the processing memory after one or more executions of d).

Due to the asynchronous nature of transmission, it is possible that a correctly detected replica points to a future replica location that is not (yet) within the current span of the processing memory. This case can be addressed by temporarily storing the location of this replica and packet information (location signaling and packet content) in a memory. When, after a number of shifts of the processing memory, the respective replica location is finally within the span of the processing memory, the respective stored replica can be re-encoded, modulated, and subtracted from the processing memory. Thereby, the PLR achievable by the present invention is further reduced.

Preferably, b) comprises: b1) performing identification of packet replicas in the processing memory; b2) for at least one of identified replicas, locating one or more other replicas of the same packet using the signaling information included in the identified replica; and b3) subtracting the one or more other replicas of the same packet from the signal samples stored in the processing memory. Further preferably, b3) involves subtracting the successfully detected packet and the re-generated one or more other replicas of the same packet from the signal samples stored in the processing memory. Further preferably, in b1) identification of replicas is performed by successively applying a first correlator to groups of signal samples stored in the processing memory; and the first correlator yields a degree of correlation between the groups of signal samples and an acquisition bit sequence included in each of the replicas. Yet further preferably, the method comprises estimating at least one of a carrier frequency, a carrier phase, a signal amplitude and a symbol clock timing (i.e. physical layer symbol clock reference) from the acquisition bit sequence of the identified replica. Yet further preferably, b2) involves attempting to decode the at least one of identified replicas.

The method may further comprise repeating b1) to b3) until a predetermined number of iterations is reached. In the above, b3) may further comprise: re-generating the one or more other replicas at the signal sample level; and subtracting the re-generated one or more other replicas from the signal samples stored in the processing memory. Further, b3) may comprise re-generating the one or more other replicas at the signal sample level; and subtracting the successfully detected packet and the re-generated one or more other replicas of the same packet from the signal samples stored in the processing memory. Alternatively, b3) may further comprise: re-generating the one or more other replicas at the signal sample level; correlating the one or more re-generated other replicas with groups of signal samples stored in the processing memory at the one or more locations indicated by the signaling information; determining at least one of a carrier frequency, a carrier phase, a signal amplitude and a symbol clock timing using a result of the correlation; adjusting the re-generated one or more other replicas in accordance with the determined at least one of the carrier frequency, the carrier phase, the signal amplitude and the symbol clock timing; and subtracting the adjusted re-generated one or more other replicas from the signal samples stored in the processing memory.

Accordingly, a packet-by-packet interference cancellation scheme is implemented that drastically decreases the PLR. It is to be particularly noted that this interference cancellation scheme can be applied regardless of the asynchronous arrival of the virtual frames.

According to another aspect of the invention, a system of a plurality of transmitters sharing a transmission channel is provided, wherein transmission proceeds on the basis of a first unit of transmission of fixed length that is subdivided into a plurality of second units of transmission of fixed length, each of the transmitters comprising: means for associating, for each packet to be transmitted at least two replicas with respective second units of transmission within a current first unit of transmission; means for generating the at least two replicas, wherein in each of the two replicas signaling information is included, the signaling information indicating relative positions of the other replicas of the same packet within the current first unit of transmission with respect to the given replica; means for setting a start timing for beginning transmission of the current first unit of transmission independently of the other transmitters of the plurality of transmitters sharing the transmission channel; and means for transmitting the at least two replicas at respective timings in accordance with their association with the respective second units of transmission within the current first unit of transmission.

Preferably, the start timing is set a predetermined or random duration after generation of the at least two replica by the means for generating the at least two replica has been completed. Further preferably, the start timing is set without synchronization with a shared receiver associated with the communication channel. Yet further preferably, the start timing is set such that there may occur a situation in which, at a time of reception at shared receiver associated with the communication channel, an offset in the time domain between a first unit of transmission transmitted by a first transmitter of the plurality of transmitters and a first unit of transmission transmitted by a second transmitter of the plurality of transmitters is not an integer multiple of the length of the first unit of transmission.

Further, the signaling information may indicate the relative positions of the other replicas of the same packet with respect to the given replica in terms of an integer number of second units of transmission.

A particular advantage is achieved if exactly two replicas are generated of each packet to be transmitted.

Each of the transmitters may further comprise means for setting a power of transmission for the current unit of transmission in accordance with a randomization scheme; and the means for transmission may transmit all generated replica that are associated with second units of transmission of the current first unit of transmission in accordance with the power of transmission. Thus, the power of transmission is a VF unique randomized power of transmission. Alternatively, each of the transmitters may further comprise means for setting, for each of the generated replicas, a power of transmission in accordance with a randomization scheme, so that when there are $N_{rep}$ generated replicas, $N_{rep}$ independent powers of transmission are set; and the means for transmission may transmit each of the $N_{rep}$ generated replicas in accordance with the respective one of the $N_{rep}$ independent powers of transmission.

It is of further advantage if a first one of the two or more replica is associated with the earliest second unit of transmission within the current first unit of transmission. Alternatively, a first one of the two or more replica may be associated with a second unit of transmission within the current first unit of transmission in accordance with a congestion control policy.

According to another aspect of the invention, a transmitter for use in the inventive system is provided.

According to another aspect of the invention, an apparatus for recovering, at a receiver, data packets transmitted over a transmission channel shared by a plurality of transmitters by the inventive method of transmitting data packets is provided, the apparatus comprising: a processing memory which is of FIFO type and has an entry side and an exit side, wherein a length of the processing memory corresponds to a length in the time domain that is larger than the length of the first unit of transmission; means for storing signal samples obtained in order from a received signal in the processing memory; means for sequentially scanning the processing memory for identifying and decoding replicas in the processing memory that are not affected by destructive collisions with replicas of other packets, locating other replicas of the same packet by using the signaling information included in the decoded replicas, performing interference cancellation by cancelling the located other replicas from the processing memory if they are affecting replicas of other packets by destructive interference, and identifying and decoding other replicas which, after the interference cancellation, are no longer affected by destructive interference; and means for shifting the signal samples stored in the processing memory by a predetermined number of signal samples towards the exit side of the processing memory, so that at the exit side of the processing memory the predetermined number of signal samples are discarded, and adding a corresponding number of signal samples, that have been obtained in order, on the entry side of the processing memory, wherein the predetermined number of signal samples corresponds to a length in the time domain that is smaller than the length of the first unit of transmission.

Preferably, the length of the processing memory corresponds to more than two times the length of the first unit of transmission. Further preferably, the length of the processing memory corresponds to less than or equal to three times the length of the first unit of transmission.

A particular advantage is achieved if the apparatus further comprises: means for storing, if one of the one or more of the other replicas located by the means for locating one or more replicas of the same packet is not fully stored in the processing memory, decoded data of the decoded replica in a memory; and means for cancelling interference by the respective one of the other replicas when the respective one of the other replicas is fully stored in the processing memory after one or more operations of the means for discarding the predetermined number of signal samples.

Preferably, the means for sequentially scanning the processing memory comprises: means for performing identification of replicas in the processing memory; means for locating, for at least one of identified replicas, one or more other replicas of the same packet using the signaling information included in the identified replica; and means for subtracting the one or more other replicas of the same packet from the signal samples stored in the processing memory. The means for subtracting may be configured to subtract the successfully detected packet and the re-generated one or more other replicas of the same packet from the signal samples stored in the processing memory. Further preferably, the means for performing identification of replicas comprises means for successively applying a first correlator to groups of signal samples stored in the processing memory; and the first correlator yields a degree of correlation between the groups of signal samples and an acquisition bit sequence included in each of the replicas. Yet further preferably, the apparatus comprises means for estimating at least one of a carrier frequency, a carrier phase, a signal amplitude and a symbol clock timing from the acquisition bit sequence of the identified replica. Yet further preferably, the means for locating the one or more other replicas of the same packet is also configured for attempting to decode the at least one of identified replicas.

The means for subtracting may comprise: means for re-generating the one or more other replicas at the signal sample level; and means for subtracting the re-generated one or more other replicas from the signal samples stored in the processing memory. The means for subtracting the re-generated one or more other replicas from the signal samples stored in the processing memory may be configured to subtract the successfully detected packet and the re-generated one or more other replicas from the signal samples stored in the processing memory. Alternatively, the means for subtracting may comprise: means for re-generating the one or more other replicas at the signal sample level; means for correlating the one or more re-generated other replicas with groups of signal samples stored in the processing memory at the one or more locations indicated by the signaling information; means for determining at least one of a carrier frequency, a carrier phase, a signal amplitude and a symbol clock timing using a result of the correlation; means for adjusting the re-generated one or more other replicas in accordance with the determined at least one of the carrier frequency, the carrier phase, the signal amplitude and the symbol clock timing; and means for subtracting the adjusted re-generated one or more other replicas from the signal samples stored in the processing memory.

Another aspect of the invention relates to a signal that results from transmission of data packets by the inventive transmission method.

Summarizing, the present invention achieves better throughput performance than CRDSA while operating in a truly asynchronous mode with a similar signaling overhead for indicating relative positions of packet replicas and similar modulator complexity compared to CRDSA. This improved performance is accompanied by a sizeable reduction in the demodulator complexity since only two replicas per packet to be transmitted are typically necessary to achieve low values of the PLR. The transmission latency of the proposed scheme is also considerably improved with respect to CRDSA, wherein a delay reduction ranges from a factor of two to a factor of nine depending on the particular scheme and Media Access Control (MAC) load. Compared to the more conventional slotted ALOHA or ALOHA schemes, the throughput that is achievable by the present invention is about three orders of magnitudes better, which allows reaching an efficiency well in excess of 1 b/s/Hz over a pure RA channel in the presence of Poisson traffic.

BRIEF DESCRIPTION OF THE FIGURES

FIG. 5 is a functional diagram of an implementation of a transmitter according to the first embodiment of the invention;

FIGS. 13A and 13B are graphs showing the dependence of the performance of the present invention on the window length;

FIG. 19 is a schematic diagram showing an average interference generated over one of the packets;

FIG. 20 is a schematic diagram showing a correlation between replicas of different packets.

DETAILED DESCRIPTION OF THE INVENTION

Preferred embodiments of the present invention will be described in the following with reference to the accompanying figures, wherein in the figures, identical objects are indicated by identical reference numbers. It is understood that the present invention shall not be limited to the described embodiments, and that the described features and aspects of the embodiments may be modified or combined to form further embodiments of the present invention.

The scheme provided by the present invention is referred to by the inventors as Asynchronous Contention Resolution Diversity ALOHA (ACRDA). The ACRDA scheme has been found to perform equal to or better than CRDSA, wherein the feature of exploiting packet replicas and associated location signaling of CRDSA is preserved. This technique is considered important for non spread-spectrum RA schemes as it allows boosting the packet collision resolution capabilities. It is to be noted that unlike SSA or E-SSA, the present invention may be easily deployed to existing legacy MF-TDMA networks.

Figure 1:
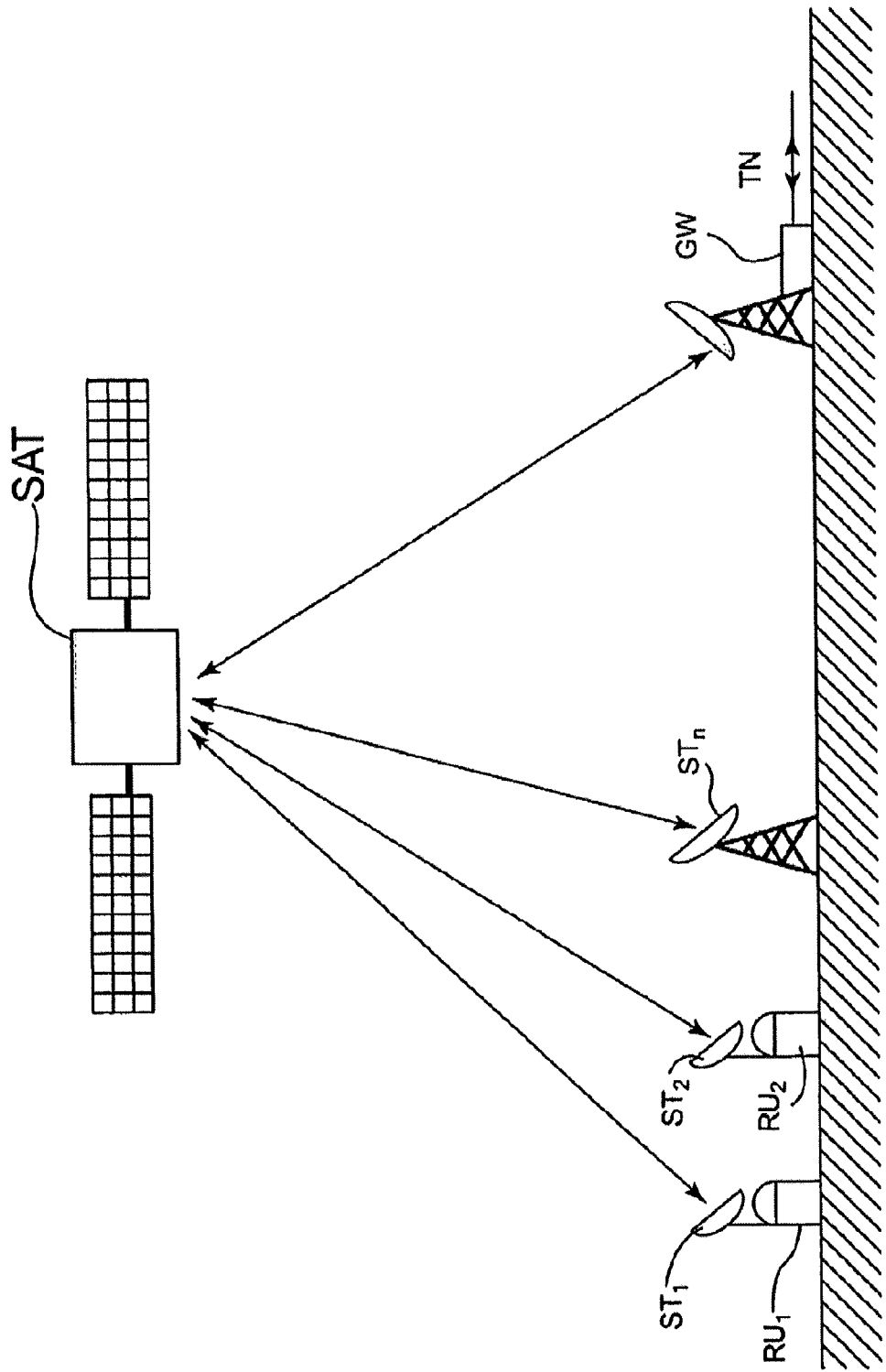
FIG. 1 illustrates a satellite communication system to which the invention may be applied.

FIG. 1 diagrammatically illustrates a satellite communication system to which the present invention may be applied. Such a system comprises n terrestrial satellite terminals $ST_1$ to $ST_n$ able to set up a bidirectional connection so with a receiver station, such as a gateway GW, via a satellite SAT, said gateway GW being in turn connected to a terrestrial network TN, such as the Internet or a private network. The terminals $ST_1$ and $ST_2$ are "residential" terminals, which serve only one respective user $RU_1$, $RU_2$. For example, these may be small terminals installed next to a M2M or SCADA equipment that time to time shall report some telemetering data (machine, sensor, car, electricity counter etc.), in the home of a person and used to provide a connection to the Internet and/or to a digital television service with a return channel. These terminals use the uplink of the communications channel to transmit small data packets in accordance with a bursty traffic profile. The system also comprises a certain number of terminals, generally a very small minority of the terminals, having different characteristics, such as the terminal $ST_n$ which transmits large packets, thereby generating a "bulky traffic" type traffic profile. The various terminals share the same transmission channel using a bursty packet transmission operating on a single or multiple carriers (in case of a slotted random access system a MF-TDMA technique is used). In the following, for reasons of conciseness and without intended limitation, the simpler case of a single carrier ACRDA system will be described.

In the following, the present invention will be described in detail, emphasizing the differences with respect to the CRDSA and CRA protocols.

In slotted RA schemes, for a given receiver, the boundaries of time slots and frames of time slots are global to all transmitters. These boundaries are defined with reference to the timeline at the given receiver. Transmitters usually have different propagation delays to the receiver. Closed loop slot synchronization mechanisms are used to calculate the timing advance needed in each transmitter, so that bursts arrive at the receiver within the boundaries of the intended slot. This requires that each satellite terminal shall periodically transmit bursts to allow the gateway to estimate timing corrections to be sent back to the terminals using the forward link carrier signaling fields.

Figure 2:
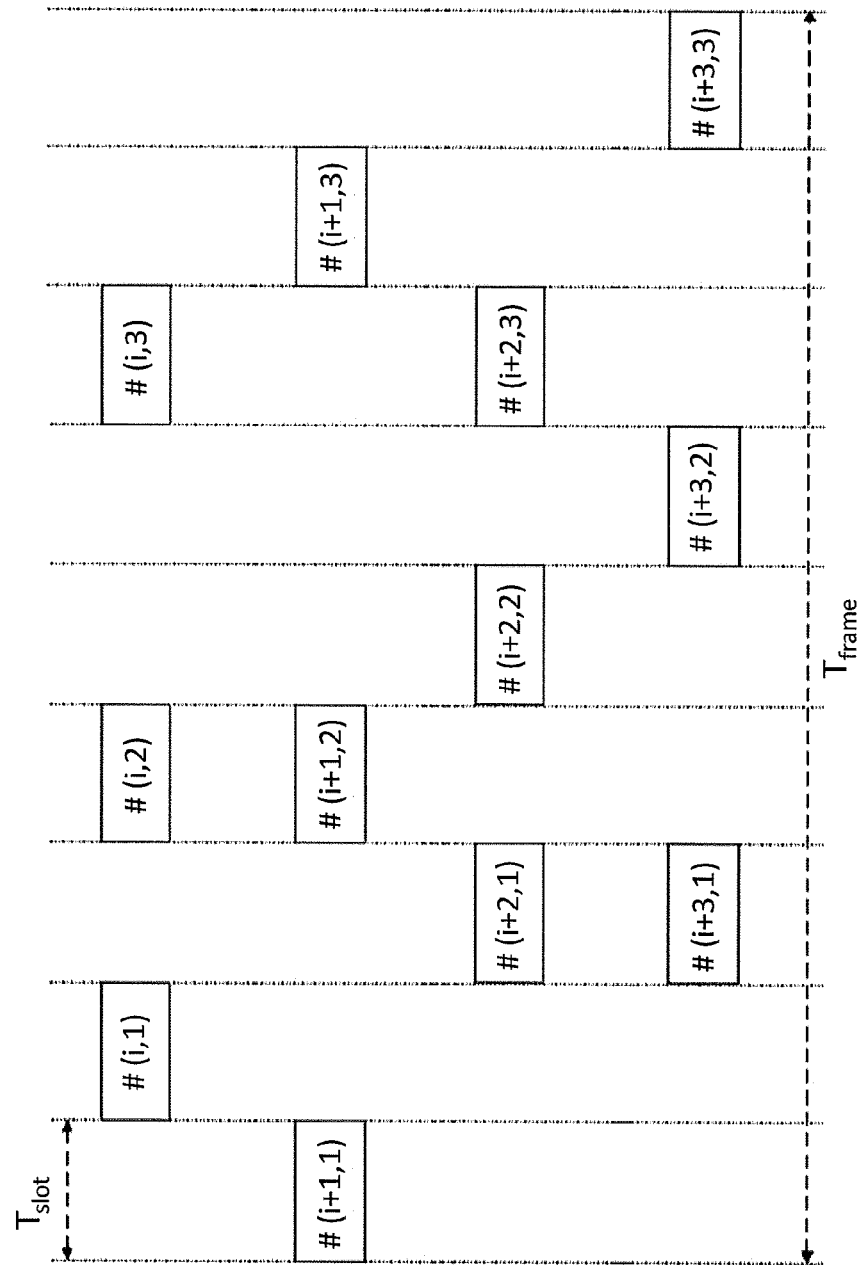
FIG. 2 illustrates an example of frames at a time of reception according to the prior art.

FIG. 2 depicts packets arriving at a slotted CRDSA RA demodulator. The first index in respective parentheses identifies the packet to which the replica corresponds. Replicas of the same packet (i.e. any of packets i, i+1, . . . , i+3) are located on the same horizontal line. In reality different packet replicas with different first index i may overlap. The second index in the respective parentheses identifies the packet replica (i.e. relates to a packet replica number) and ranges from 1 to the number of replicas for each packet to be transmitted, $N_{rep}$. As an example, (i,j) indicates the j-th replica of packet i. In the case of FIG. 2, the frame and slot boundaries are defined with reference to the receiver timeline. Hence all packets arrive within slot boundaries, and all packets that are a CRDSA copy of each other arrive in the same CRDSA frame. This allows for a frame-based memory processing at the demodulator side since the content of different frames is totally de-correlated.

According to the inventive ACRDA scheme, time is still divided into slots and frames of slots. Nonetheless, the slot and frame boundaries are not defined globally with reference to the timeline at the desired receiver. Instead, the boundaries of slots and frames of slots are local to the respective transmitter. Hence, slots and frames are completely asynchronous among transmitters. The term "virtual frame" (VF, first unit of transmission) is used in the remainder of the application to specifically refer to the concept of frames of slots (second units of transmission) that are only local to each transmitter.

In ACRDA, each virtual frame is composed of $N_{slots}$, each slot having a duration $T_{slot}$ (length), so that an overall frame duration (length) is $T_{frame}=N_{slots} \cdot T_{slot}$. In the following, for simplicity, the assumption will be made that the duration $T_{slot}$ of one slot corresponds to a burst length. In general however, the slot duration $T_{slot}$ could actually take any other value including fractions and multiples of the burst length.

Figure 3:
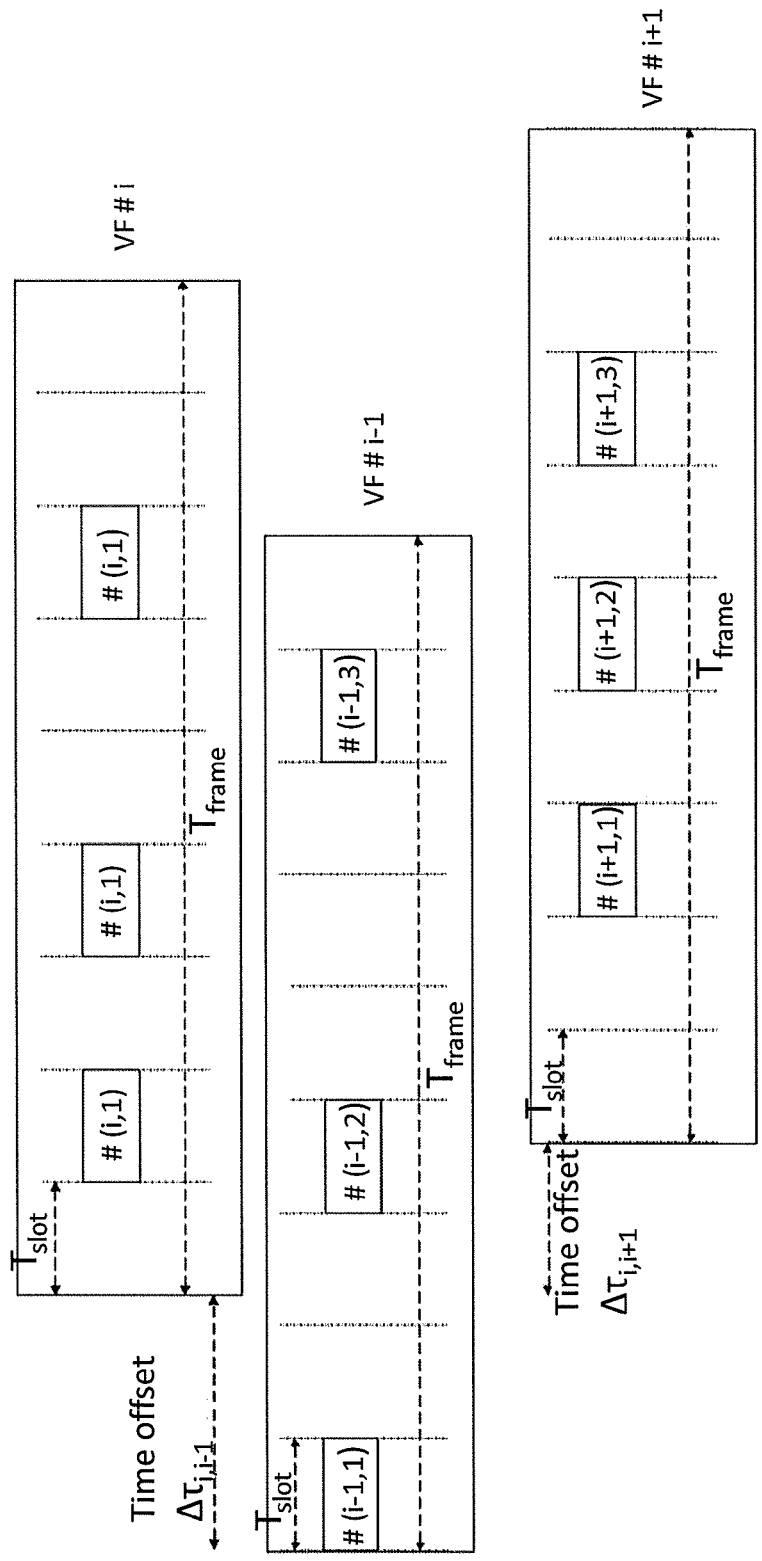
FIG. 3 illustrates an example of frames at the time of reception according to the invention.

FIG. 3 illustrates the notion of ACRDA virtual frames and associated slots whose definition is local to each transmitter. Different transmitters are not time-synchronized with each other (and not time-synchronized with a shared receiver) and hence the time offset $\Delta\tau_{n,m}$ between virtual frames n and m that have been transmitted by different transmitters is arbitrary. In other words, the ACRDA scheme allows for situations in which the time offset $\Delta\tau_{n,m}$ is not an integer multiple of the length (i.e. duration) of the virtual frame. In a given transmitter, the virtual frames will respectively start with a random time offset which is typically specified by a random access congestion control mechanism. In the above, it is to be noted that $T_{slot}$ and $T_{frame}$ durations are the same for the all the transmitters in the shared medium.

The inventive ACRDA scheme can be used in a conventional MF-TDMA system simply by reserving one (or more) frequency slot(s) for application of the asynchronous ACRDA scheme. This means that part of the MF-TDMA frequency spectrum will be reserved to the RA (ACRDA) applications on a semi-static basis. Moreover, ACRDA does not require spectrum spreading as in SSA or E-SSA, which for this reason could not be deployed in legacy MF-TDMA networks, by contrast to the present invention.

First Embodiment

The first embodiment of the invention relates to a modulator and a method of modulation for packet mode transmission over a transmission channel shared by a plurality of users or transmitters. In the following, the terms replica and packet replica will be used synonymously.

Figure 4:
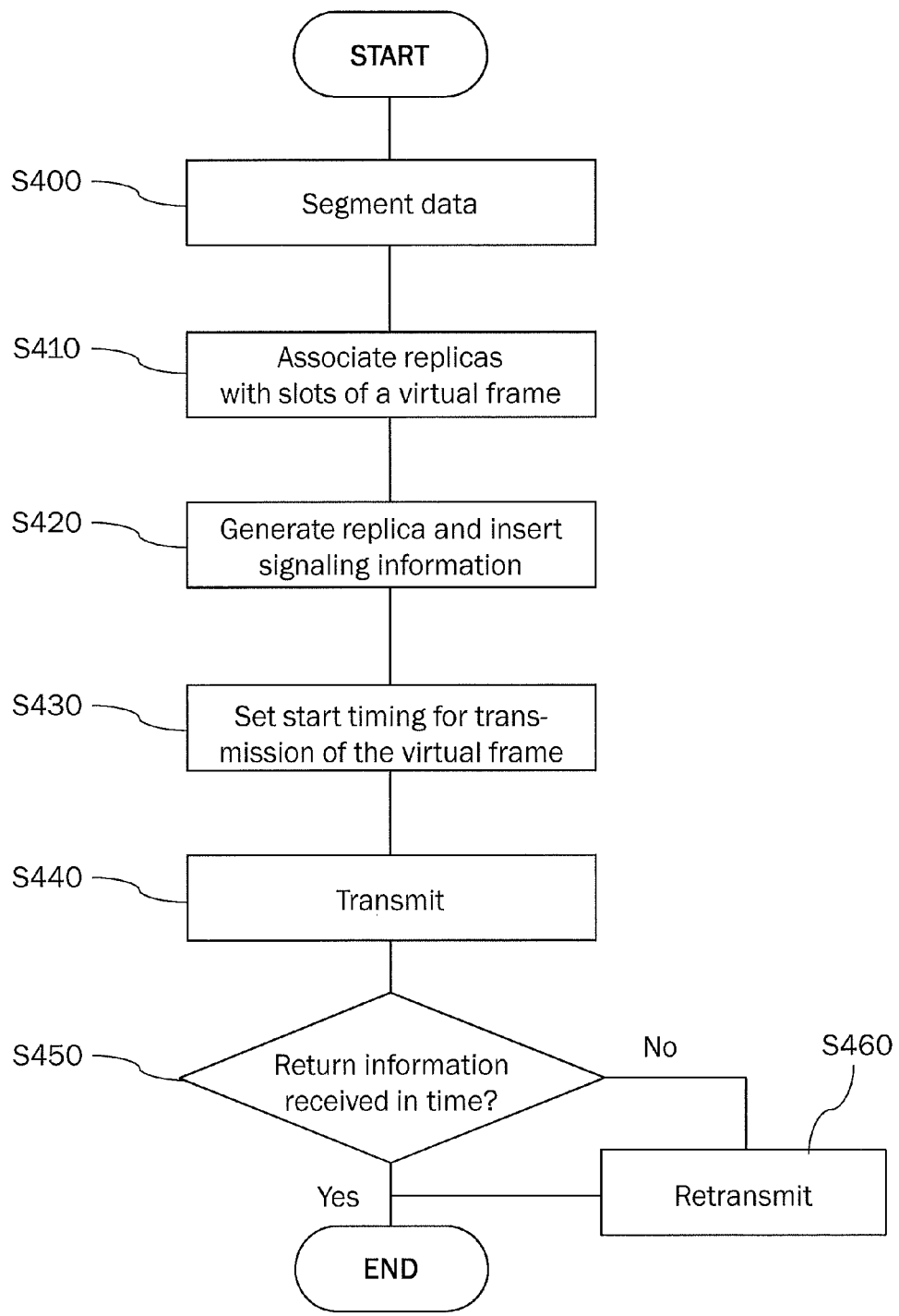
FIG. 4 is a flowchart illustrating a transmission method according to a first embodiment of the invention.

Operation of the inventive ACRDA modulator 500 is illustrated in FIG. 4 and a functional block diagram of the ACRDA modulator 500 is shown in FIG. 5. Operation of the modulator 500 can be summarized as follows.

At step S400 the incoming information that is to be transmitted is buffered and organized (segmented) in packets of fixed size, wherein the fixed size corresponds to the duration (length) of a slot, $T_{slot}$. This step is performed by a traffic packets queue 505, a MAC packet segmenting unit 510, and a buffer 515.

At step S410 the locations of $N_{rep}$ packet replicas within the virtual frame slots are randomly selected among the possible $N_{slots}$ each of which has duration (length) $T_{slot}$.

Therein, it is ensured that the randomly generated replica locations are not overlapping, that is, that in each slot of the virtual frame at most one replica is located. In case the randomly generated replica locations are overlapping, a new set of random locations is generated. In this way, the generated replicas are randomly associated with respective slots within the virtual frame. A preferred choice for $N_{rep}$ in the context of the present invention is 2. As an example, for $N_{rep}=2$, if one packet is to be transmitted, two replicas are associated with slots of the virtual frame at step 410 and transmitted at step 440.

Step S410 is performed by the ACRDA modulator controller 555, which controls operation of the modulator 500. In this sense, the ACRDA modulator controller 555 acts as means for associating the replicas with slots of the virtual frame.

At step S420, $N_{rep}$ replicas are coded together with the packet replica location(s) information (e.g. slot offset(s) $\Delta_{slots}$) relative to the start of the current packet time within the virtual frame with duration $T_{frame}$. Thus, for each packet to be transmitted (i.e. for each segmented portion of data payload), $N_{rep}$ packet replicas are generated, each including signaling information that indicates locations of the other replicas of the same packet. Therein, locations are understood as the slots with which the other replicas of the same packet have been associated. For $N_{rep}=2$, the signaling information of the first of the two replica (e.g. the replica with the lower slot number within the virtual frame) indicates the location of the second replica by indicating a first slot offset, while the signaling information of the second replica indicates the location of the first replica by indicating a second slot offset. Both slot offsets are equal in magnitude, whereas in the present example the first slot offset is positive and the second slot offset is negative. However, also alternative implementations of the signaling information are possible, in which e.g. the offset is given in units of seconds. The replicas' signaling location is included in the replica so that it occupies a given and known number of bits in a known location in the packet payload.

The signaling information is generated at a replica packets signaling information generation unit 525. A unique (typically common to all transmitters sharing the resource) preamble (acquisition bit sequence) that allows for packet identification and channel estimation in the demodulator is generated in a preamble generation unit 530. Data structures that may be used as a preamble have been described in laid open US patent application US 2006/0171418 A1. The packet to be transmitted and the signaling information are input to a multiplexer 520, the payload data of the packet to be transmitted is coded by using Forward Error Correction (FEC) in a packet FEC coding unit 535. The data payload and the preamble are input to a burst multiplexer 540 and band limited by using a baseband filter unit 545 typically applying a Square Root Raised Cosine (SRRC) filter, and converted into a physical layer signal. Thus, the replica packets signaling information generation unit 525, the preamble generation unit 530, the multiplexer 520, the packet FEC coding unit 535, the burst multiplexer 540, and the baseband filter unit 545 act as means for generating the replicas.

The start time $\tau_i$ of the current virtual frame i is set at the terminal side once the physical layer packets are ready to be transmitted (i.e. after step S420 has been completed) at step S430. This step is performed by the ACRDA modulator controller 555, which in this sense acts as means for setting the start time $\tau_i$. The start time $\tau_i$ is set independently of other transmitters, and independently of a timeline of a shared receiver. Thus, no network timing synchronization is required for controlling $\tau_i$ so that access to the shared transmission channel is truly asynchronous. The start time may be set at a predetermined duration (time span) after the physical layer packets are ready to be transmitted, including the case in which the start time is set immediately after the physical layer packets are ready to be transmitted. If transmission of the virtual frame is controlled in accordance with a congestion control policy, the start time $\tau_i$ may be set at a random duration after the physical layer packets are ready to be transmitted. Congestion control policies for RA over satellite are typically backing off the next packets over a certain time span (typically randomly generated following an exponential distribution). The congestion control algorithm can be applied when collision occurs or depending on the current gateway MAC load estimation to avoid congestion instabilities. There are applications such as tele-voting for which congestion control countermeasures have to be implemented by default as the traffic by nature is very concentrated in time and has a distribution differing from a Poisson type of distribution.

At step S440 the coded and modulated packet replicas with ancillary replica location signaling information are transmitted in the randomly selected slots of the virtual frame. That is, the replicas are transmitted at respective timings in accordance with their association with the respective slots within the current virtual frame. Transmission of the virtual frame is started at the start time $\tau_i$. Therefore, for instance, a replica associated with a j-th slot in the virtual frame is transmitted at a time $\tau_i+(j-1)\cdot T_{slot}$. A carrier local oscillator 550 ensures transmission of respective replicas at appropriate carrier frequency.

If required, the associated packet replica(s) power level can be randomized on a frame-by-frame basis to further enhance the ACRDA throughput. In general the same level of power randomization is applied to the packet replicas present in the virtual frame. However, depending on the system design, it may be more convenient to exploit different realizations of the power randomization for the packet replica(s) contained in the virtual frame. Possible randomization schemes are described in R. De Gaudenzi, unpublished PCT Patent filing "Transmit Power Control in a Spread-Spectrum Unslotted Random Access Communication System", 2012.

In the above, steps S430 and S440 significantly deviate from the CRDSA modulator processing, according to which the start of the frames at the time of input to the satellite transponder (or gateway demodulator) interface is common to all network terminals. Accordingly, in CRDSA the signaled packet replicas' location (slot number) is absolute and not relative to the current packet replica as in ACRDA. Steps S400 to S420 on the other hand essentially correspond to the CRDSA modulator processing, which has been described in laid open US patent application US 2006/0171418 A1.

Second Embodiment

The second embodiment of the invention relates to a variation of the modulator and method of modulation according to the first embodiment.

A modified version of ACRDA which is referred to by the inventors as ACRDA variant is obtained by "fixing" the location of the first replica of a packet into the first slot of the virtual frame, while randomizing the location of the ($N_{rep}-1$) other replicas of the same packet in the rest of the virtual frame slot locations, i.e. by associating the first replica with the first slot of the virtual frame and randomly associating the ($N_{rep}$−1) other replicas with ($N_{rep}$−1) of the remaining slots of the virtual frame. The main advantage of this variant resides in a reduction of transmission delay since by contrast to the first embodiment, there is no waiting time for transmission of the first replica of the packet to be transmitted. In the first embodiment, for association of the first replica with the j-th slot, the delay would have amounted to (j−1)·$T_{slot}$. This delay is avoided by the processing according to the variant of the present embodiment. It is to be noted that in the DSA or CRDSA protocols, such choice of fixing the location of the first packet into the first slot of the frame would not be feasible since this would result in an undesired increase of packet collisions.

However, the advantage of this variant may be masked by congestion control policies applied on top of the MAC layer in any practical RA system. In all cases where congestion control is active the advantages of the above described variant may be masked. Nevertheless, in the majority of systems congestion control kicks in when the MAC load approaches a critical level potentially impacting the system stability, so that the variant of the present embodiment will provide a delay reduction at least for non-critical MAC loads.

Third Embodiment

The third embodiment of the invention relates to a demodulator and a method of demodulation for a signal resulting from putting into practice the teaching of the first and second embodiments. In the following, the terms packet, packet replica and replica will be used synonymously. Therein, it is to be noted that replicas of the same packet relate back to the same packet to be transmitted, i.e. except for signaling information, replicas of the same packet contain the same payload data. Replicas of different packets relate back to different packets to be transmitted, i.e. replicas of different packets contain different payload data. Further, it is to be understood that in total $N_{rep}$ packets/packet replicas/replicas with identical payload data (except for signaling information) are contained in one virtual frame.

The ACRDA demodulator operation is considerably different from that of CRDSA due to the asynchronous nature of ACRDA virtual frames. On the other hand, the replica interference cancellation scheme described below is similar to that in the CRDSA demodulator processing. It should be noted that the present description of the ACRDA demodulator and demodulation method is valid for signals resulting from both the modulator and modulation methods disclosed in the first and second embodiments alike.

Figure 7:
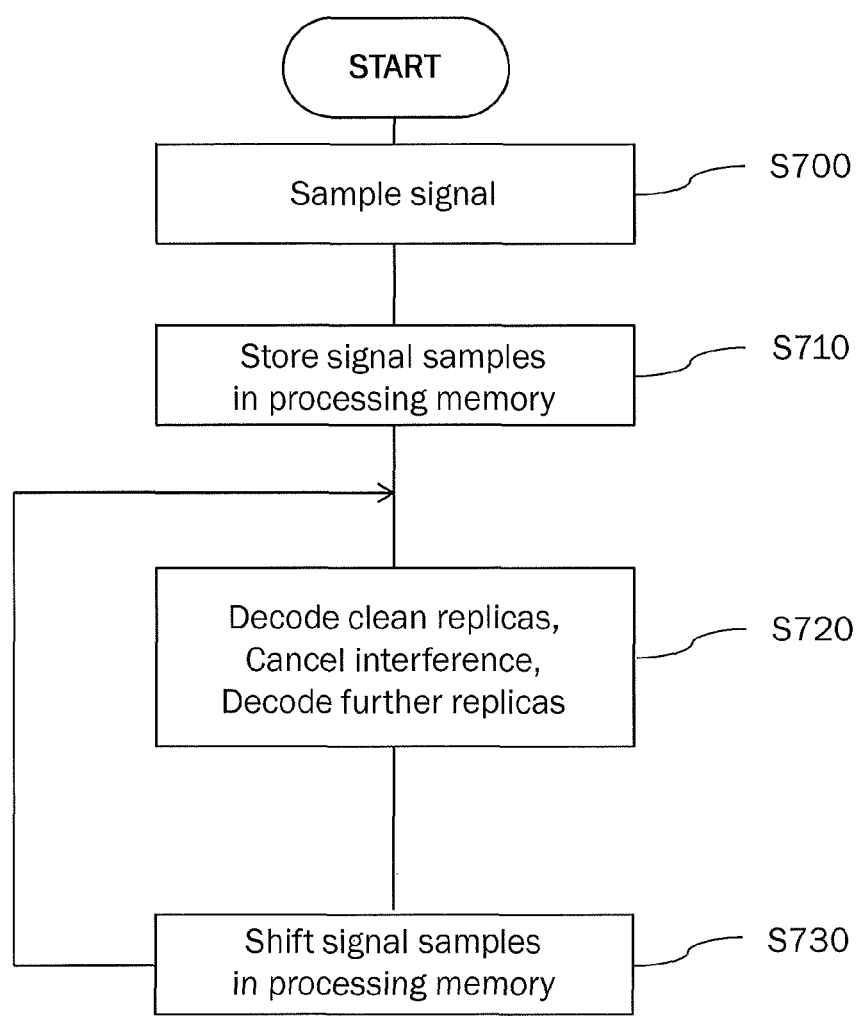
FIG. 7 is a flowchart illustrating a data packet recovery method according to a third embodiment of the invention.
Figure 11:
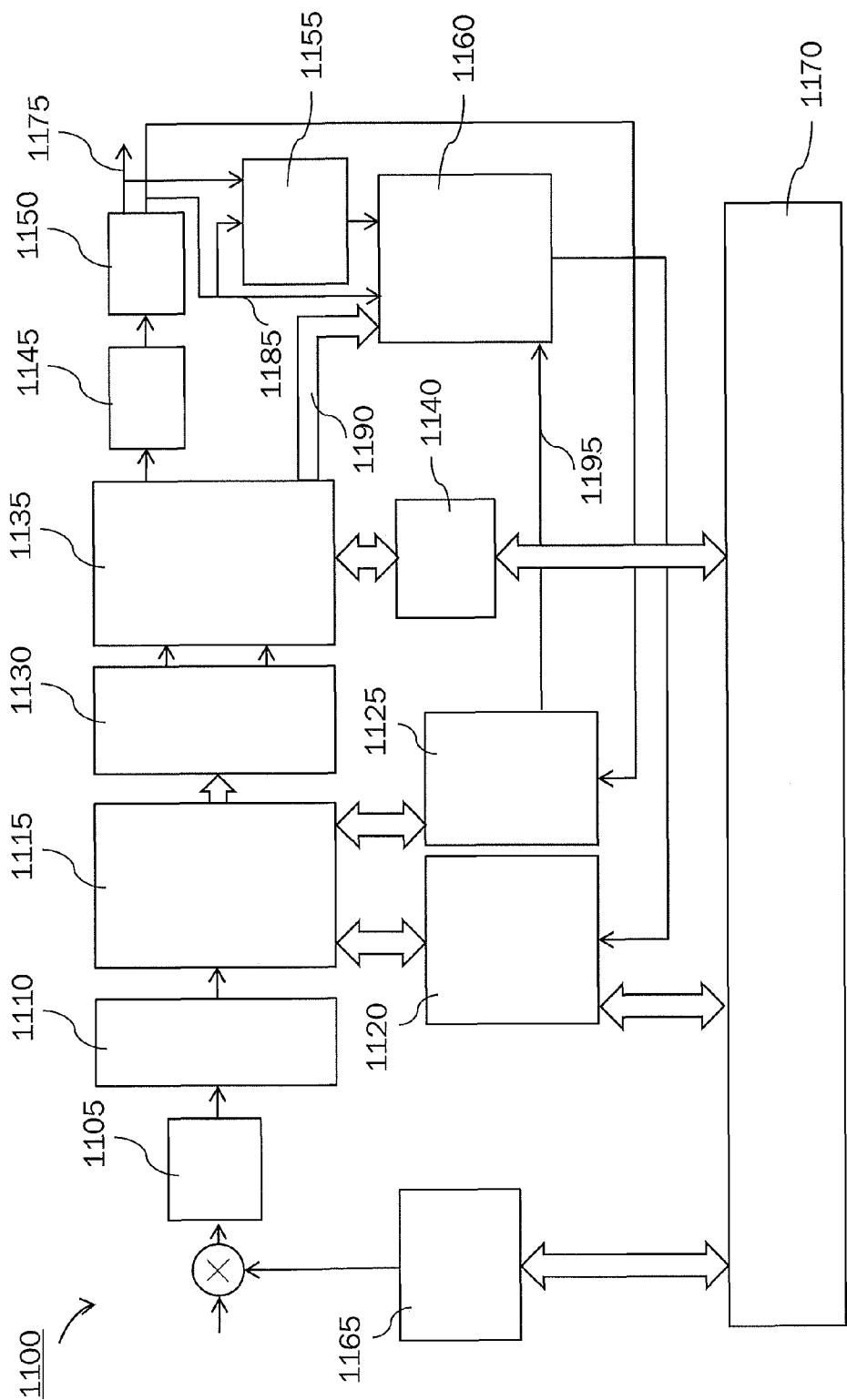
FIG. 11 is a functional diagram of an implementation of an apparatus for packet recovery according to the third embodiment of the invention.

Operation of the inventive ACRDA demodulator 1100 is illustrated in FIG. 7 and a functional block diagram of the ACRDA demodulator 1100 is shown in FIG. 11. Operation of the demodulator 1100 can be summarized as follows.

At step S700 the signal is down-converted exploiting a carrier local oscillator 1165, filtered and sampled at baseband or at intermediate frequency (IF) and then digitally converted to baseband. The sampling rate (sampling frequency $f_{sample}$) shall at least satisfy the Nyquist criterion with some oversampling to account for the radio frequency front-end excess bandwidth. Processing of the incoming signal to obtain the signal samples is performed by an analog-to-digital converter 1105 and a digital de-multiplexer 1110 separating the I-Q samples.

Figure 6A:
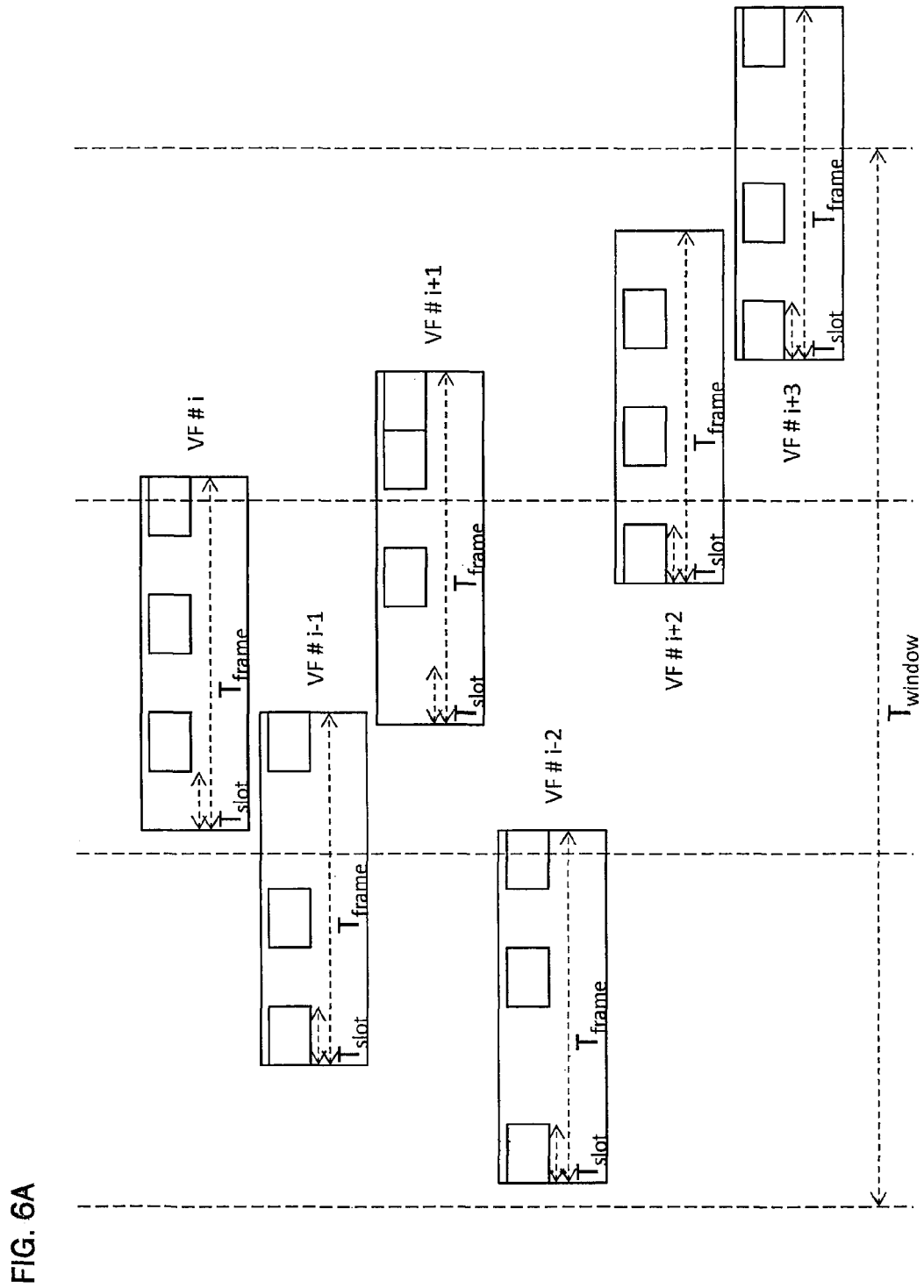
FIGS. 6A and 6B illustrate an example of a processing of frames for data packet recovery by the present invention.
Figure 6B:
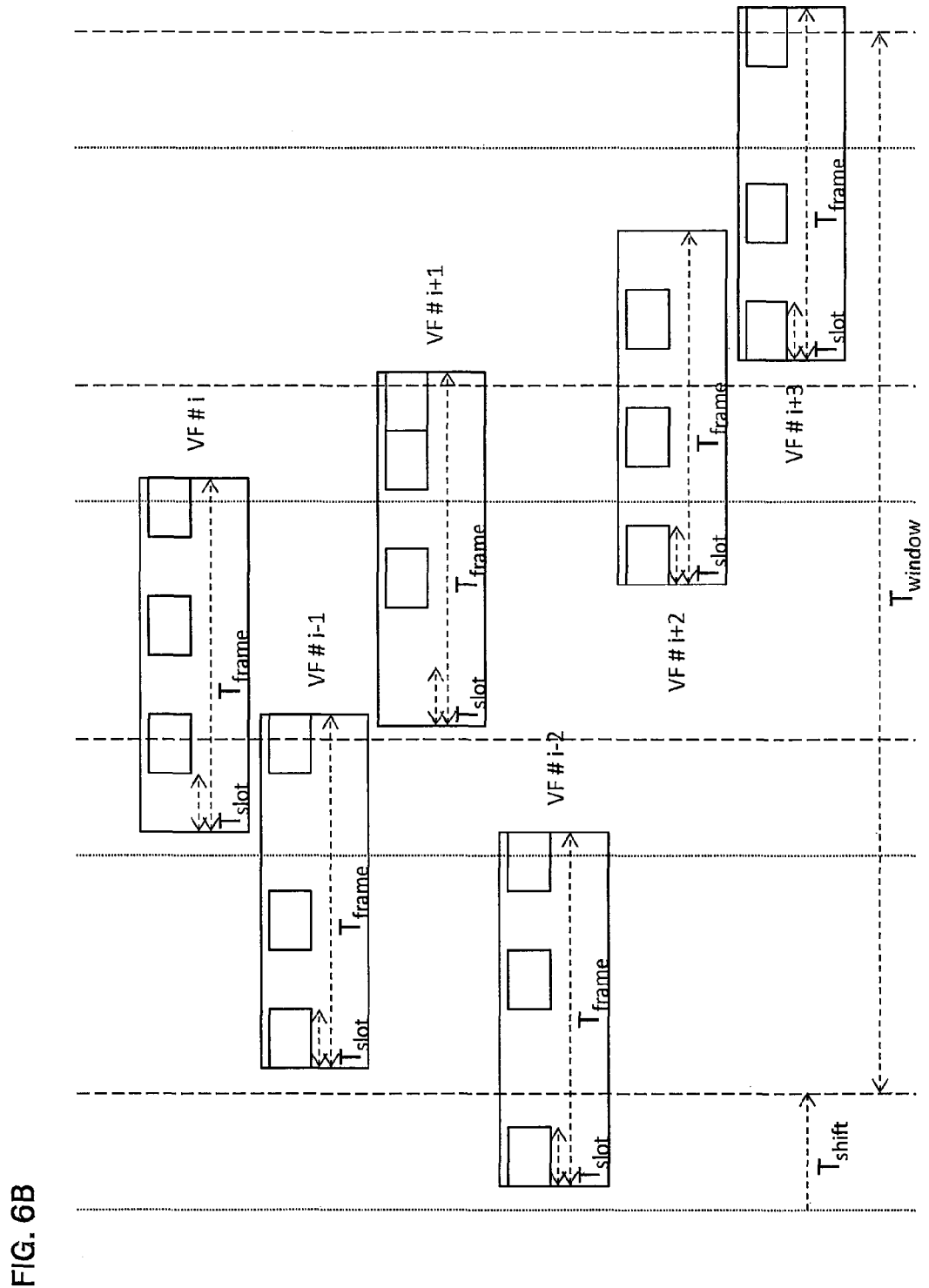

At step S710 the incoming baseband signal samples are stored in a processing memory 1115 (window memory), which is of FIFO type with an entry side and an exit side. In this sense, the analog-to-digital converter 1105 and the digital de-multiplexer 1110 separating the I-Q samples act as means for storing signal samples in the processing memory 1115. The processing memory 1115 operates as a sliding window, with sliding window index s. Operation of the processing memory 1115 as a sliding window is illustrated in FIGS. 6A and 6B. The processing memory 1115 spans W virtual frames, i.e. extends from $t_{leading}$=(s−1)·$\Delta W$·$T_{frame}$ to $t_{lagging}$=[(s−1) $\Delta W$+W]·$T_{frame}$. For a sampling frequency $f_{sample}$, the number of signal samples held in the processing memory 1115 is W·$T_{frame}$·$f_{sample}$. In FIGS. 6A and 6B, W=3 has been exemplarily chosen, although it is to be noted that in general, W does not need to be an integer. A preferred range for W is given by 2<W≤3, but larger window sizes may be required in case a large power unbalance of the incoming packets is experienced.

Once the iterative processing of the content of a specific window is completed, the window is shifted by a window shift $T_{shift}$=$\Delta W$·$T_{frame}$, with $\Delta W$ being the window shift $T_{shift}$ in fractions of the length $T_{frame}$ of the virtual frame. The shifting of the processing window is illustrated in FIG. 6B. Accordingly, once the processing of a specific window is completed, the signal samples in the processing memory 1115 are shifted from the entry side towards the exit side (i.e. from right to let in FIGS. 6A and 6B) by a number of samples spanning a time shift $T_{shift}$, i.e. by $T_{shift}$·$f_{sample}$ signal samples. In the process, signal samples spanning a time span $T_{shift}$, i.e. $T_{shift}$·$f_{sample}$ signal samples, are discarded on the exit side of the processing memory 1115. On the entry side of the processing memory 1115, a corresponding number of new signal samples, i.e. $T_{shift}$·$f_{sample}$ signal samples, are newly stored in the processing memory 1115. In other words, the window memory is shifted towards the right in time by $T_{shift}$=$\Delta W$·$T_{frame}$ so that "oldest" signal samples spanning the leftmost part of the memory are removed. The emptied rightmost part of the memory is then filled with the new incoming complex samples. Therein, the latter process may involve down-conversion, filtering and sampling at baseband of the received signal analogous to step S700. Shifting of the window is performed under control of a demodulator controller 1170 for controlling operation of the demodulator 1100, which in this sense acts as means for shifting the signal samples stored in the processing memory.

Returning to FIG. 7, at step S720, clean replicas, i.e. replicas that are not affected by destructive collision (interference) with replicas of other packets are identified and decoded. It is to be remarked that the destructive collision effect is depending on the FEC scheme adopted, the number of colliding packets, the amount of packet overlap and the power unbalance. Other replicas of the respective same packet are located by referring to the signaling information included in the decoded replicas. Once the other replicas of the respective same packet have been located, interference by the other replicas is cancelled from the processing memory 1115. Subsequently, replicas that now after the cancellation of interference, are not affected by destructive interference anymore are identified and decoded. Details of this step, which is performed by a means for sequentially scanning the processing memory, will be explained below with reference to FIGS. 8 to 10.

At step S730, the processing memory 1115 is shifted as explained above and step S720 is performed again on the new content of the processing memory 1115 after the shift.

Figure 8:
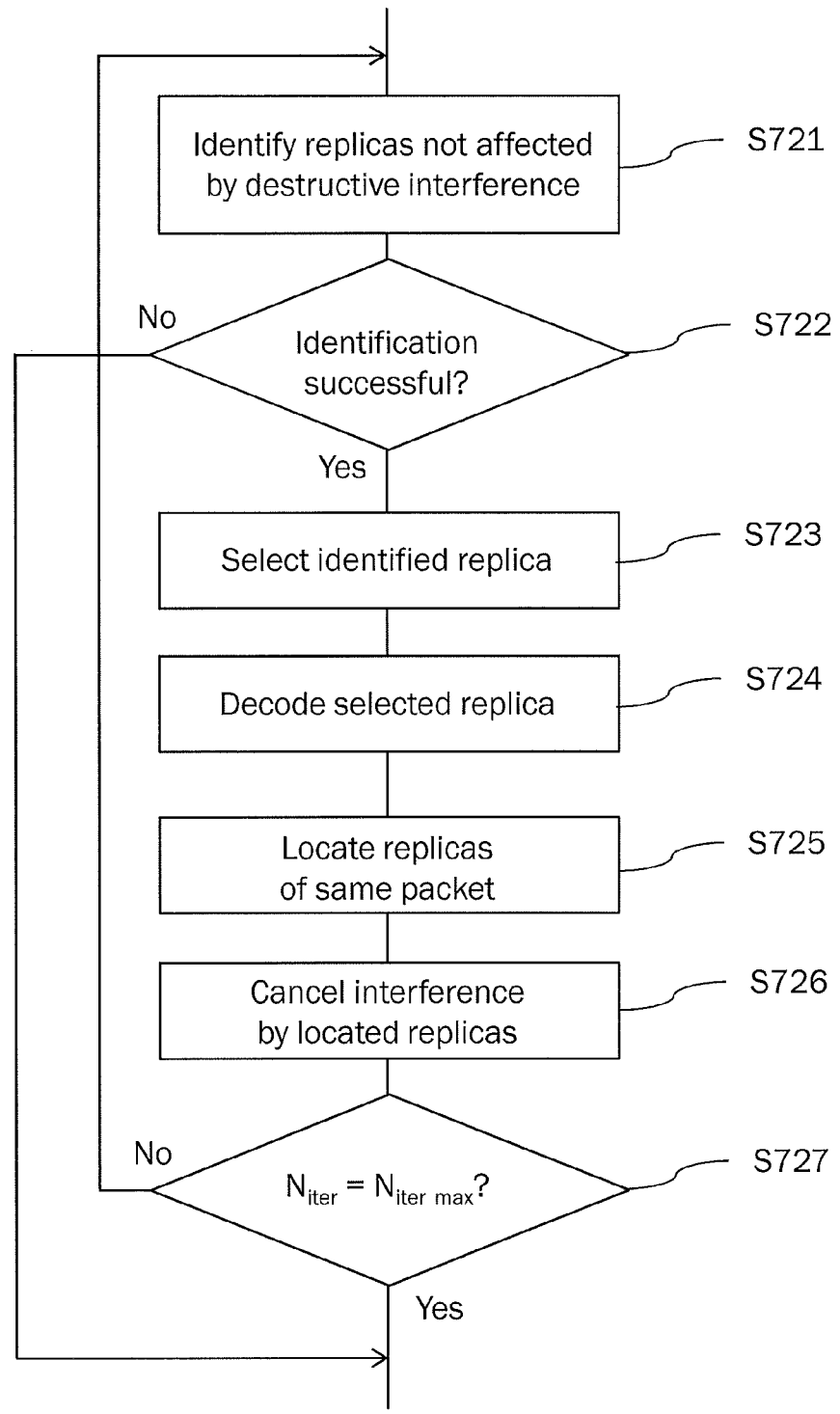
FIG. 8 is a flowchart illustrating a detail of the method of FIG. 7.

FIG. 8 illustrates details of step S720 of FIG. 7. At step S721, the unique packet preamble is searched for throughout the processing memory 1115 using a correlator matched to the preamble sequence. The correlator is sequentially run across all the signal samples stored in the processing memory 1115, wherein a peak in the correlation indicates a that a preamble is located at the respective location in the processing memory 1115. This step is performed at a preamble search unit 1140 of the demodulator 1100. In this sense, the preamble search unit 1140 acts as means for successively applying a (first) correlator and is comprised by means for performing identification of replicas.

Once a preamble has been found by applying the correlator, packet detection is attempted using preamble-based channel estimation. In this channel estimation, at least one of a carrier frequency, carrier phase, symbol clock timing (i.e. the packet physical layer symbol clock reference), symbol rate (i.e. the signalling rate of the physical layer symbols composing the packet) in the packet and power (amplitude) is estimated from the preamble. In this context it is to be noted that in general the amplitude and phase of each packet replica will be different even if it is generated from the same transmitter, since the shared transmission channel typically is time variant. In certain embodiments the channel estimation may be helped by the presence of known pilot symbols interleaved in the payload part of the packet. In this case the channel estimation is adapted along the packet to better estimate the time variant carrier phase and amplitude.

Packet detection can take advantage of power unbalance by starting from those preambles identified while scanning the memory that are the strongest in power. In satellite communication systems, power unbalance between frames transmitted by different transmitters typically is present due to e.g. different transmitter powers or different propagation lengths or non-uniform satellite antenna gain across the coverage region. Furthermore, presence of a power unbalance can be ensured by randomizing the packet replica(s) power level on a frame-by-frame basis in the inventive modulator, as described above in the context of the first embodiment.

At step S722, it is checked whether or not at least one replica of a packet has been identified in step S721. If this is not the case, the processing of step S720 ends, and operation of the demodulator 1100 proceeds to step S730, at which the processing memory 1115 is shifted. If at least one replica has been identified, operation proceeds to step S723.

If at least one packet replica has been identified, one of the identified packet replicas is selected at step S723. Alternatively, searching for the unique packet preamble in step S721 can be stopped once a first packet has been detected. In this case, step S723 of selecting one of identified packet replicas is omitted.

The selected packet replica is demodulated and decoded at step S724 by conventional decoding methods known to the expert of skill in the art. When the packet Cyclic Redundancy Check (CRC) is successful, it is decided that the packet replica has been successfully decoded, and the packet replica is declared detected. Decoding is performed at a FEC decoder 1145, which outputs a result of the decoding to a de-multiplexer 1150. The FEC decoder 1145 acts as a means for decoding replicas and is comprised by the means for successively scanning the processing memory. The de-multiplexer 1150 outputs usable payload bits 1175 as well the replica packet location signaling information 1185.

At step S725, packet replicas of the same packet (as that corresponding to the decoded packet replica) are located by using the signaling information included in the decoded packet replica: The location of the decoded packet replica in the processing memory is known. By referring to the signaling information, slot offsets $\Delta_{slots}$ for the other packet replicas of the same packets are obtained. These slot offsets translate into an offset in terms of signal samples via the sample frequency, that is, for a given slot offset $\Delta_{slots}$ between the decoded packet replica and another replica of the same packet, the corresponding offset in terms of signal samples is given by $\Delta_{samples} = \Delta_{slots} \cdot f_{sample}$. It is to be noted that for the preferred case of $N_{rep}=2$, exactly one other replica of the same packet exists within the virtual frame. This step is performed under control of the demodulator controller 1170, which in this sense acts as means for locating the other replicas of the same packet.

At step S726, interference by the located other replicas of the same packet is cancelled. Details of this step will be explained below with reference to FIG. 9.

At step S727 it is checked whether or not a number of iterations $N_{iter}$ (of steps S721 to S726) has reached a predetermined maximum number of iterations $N_{iter\ max}$. If this is the case, the processing of step S720 ends. Otherwise, the number of iterations $N_{iter}$ is incremented by one and the processing returns to step S721. By repeating steps S721 to S726, packet replicas that were identified but not decoded during the previous iteration cycle may now be processed, as well as packet replicas that were affected by destructive collisions, but by virtue of interference cancellation may now be decoded.

Figure 9:
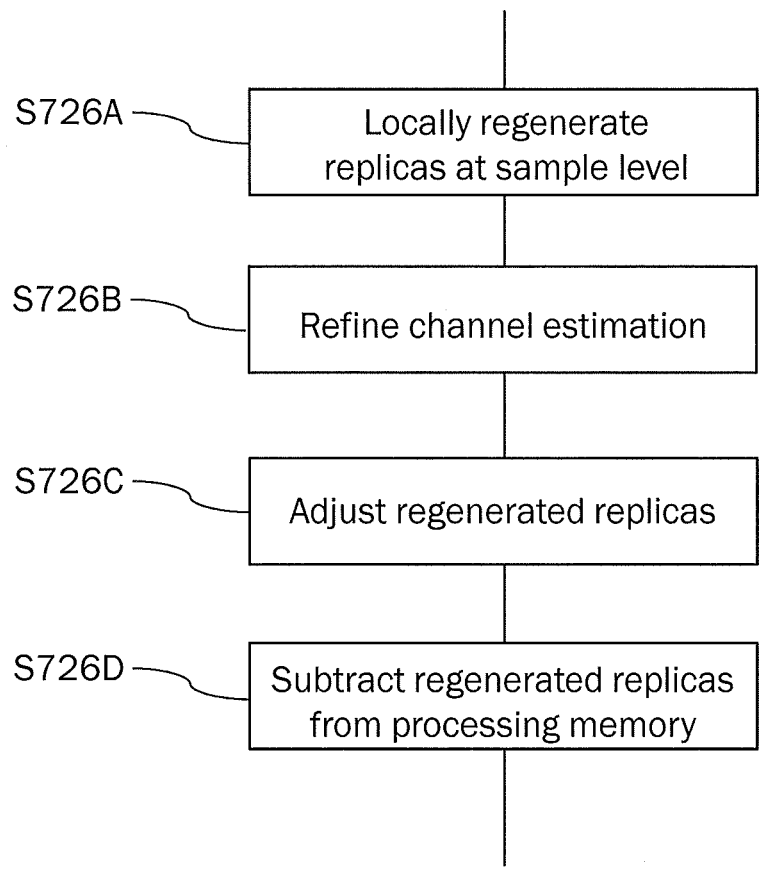
FIG. 9 is a flowchart illustrating another detail of the method of FIG. 7.
Figure 10:
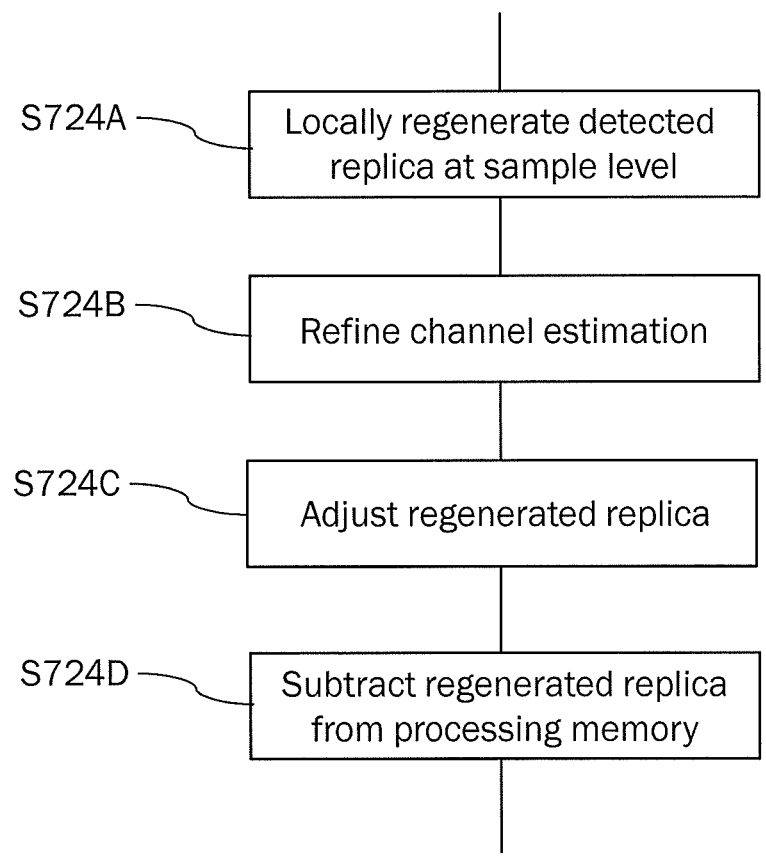
FIG. 10 is a flowchart illustrating another detail of the method of FIG. 7.

Cancellation of interference of the replicas of the same packet (as that corresponding to the detected packet replica) as performed at step S726 will now be explained in more detail with reference to FIG. 9. Steps S726A to S726D are to be understood as sub-steps of step S726.

At step S726A the ($N_{rep}-1$) physical layer packet replicas of the other replicas of the same packet (as that corresponding to the detected packet replica) are regenerated by re-encoding and modulating the payload data and the associated signaling bits. Thus, the ($N_{rep}-1$) other replicas are locally regenerated at the signal sample level. In performing this operation the replica location signaling embedded in the packet payload has to be modified compared to the detected packet replica as the relative location of the other replicas is different for each reconstructed packet replica. Evidently, the signaling information 1185 included in the decoded packet is enough to infer the locations of all the ($N_{rep}-1$) other replicas of the same packet. On the basis of this knowledge, the respective signaling information 1185 of each the ($N_{rep}-1$) other replicas of the same packet can be reconstructed. Regeneration of the replicas is performed in a FEC encoder 1155 and a packet replica regeneration unit 1160, which in this sense act as means for re-generating the other replicas at the signal sample level.

At step S726B a refined channel estimation (complex phasor) 1195 of the ($N_{rep}-1$) other replicas of the same packet is obtained by correlating the signal samples stored in the processing memory 1115 at the packet locations obtained from the signaling information of the detected packet replica with the regenerated ($N_{rep}-1$) other replicas. Therein, it is to be noted that e.g. the signal amplitude and carrier phase may vary over the duration $T_{slot}$ of the replica. It is understood that by the present procedure also the evolution of these quantities over the duration of the replica can be obtained, e.g. in the form of an array of values for each of these quantities for a digital demodulator embodiment. The replica location can be easily derived using the start of the decoded packet replica time reference and shifting (with relative sign) in the processing memory 1115 by an integer amount of $T_{slot}$ periods (i.e. by a multiple of $T_{slot} \cdot f_{sample}$ signal samples) according to the signaling information contained in the decoded packet replica. The refined channel estimation is performed by a replica packet channel estimator 1125, which acts as means for correlating the re-generated replicas with signal samples stored in the processing memory and as means for determining at least one of the carrier frequency, the carrier phase, the signal amplitude and the symbol clock timing. This decision directed refined channel estimation allows approaching optimum maximum likelihood channel estimation in particular for the time variant carrier phase and amplitude due to possible channel fading, local oscillator instabilities etc. The refined channel estimation is important to best remove the detected packet replica(s) from the FIFO memory.

Using the result of the refined channel estimation, the regenerated versions of the ($N_{rep}$-1) other replicas of the same packet are adjusted at step S726C by methods known to the expert of skill in the art. This step is performed under control of the demodulator controller 1170, which in this sense acts as means for adjusting the re-generated replicas.

At step S726D the ($N_{rep}$-1) other replicas of the same packet are cancelled by subtracting the regenerated and adjusted versions as described above at the locations identified by the signal information included in the detected packet replica from the processing memory 1115 (or rather, from the signal samples stored therein). This subtraction is performed at an interference cancellation processor 1120, which acts as means for subtracting the (adjusted) re-generated replicas.

Due to the asynchronous nature of transmission and the processing of the signal samples by means of a sliding window memory, it is possible that a correctly detected packet replica points to a future replica location that is not (yet) within the current span of the sliding window, i.e. that is not (yet) stored in the processing memory 1115. In this case, the demodulator 1100 temporarily stores the location of this replica and packet information (location signaling and packet content) in a memory. When, after a number of window shifts at step S730, the respective replica location is finally within the span of the sliding window, the respective stored replica can be re-encoded, modulated, and subtracted from the processing memory 1115 as described above.

In the above discussion, not only the ($N_{rep}$-1) other replicas of the same packet are subtracted from the processing memory 1115, but also the detected packet itself is subtracted. Cancellation of the detected packet itself is described below with reference to FIG. 10.

At step S724A the payload and signaling bits obtained at step S724 are re-encoded and modulated to derive the packet modulated symbols, that is, the detected packet replica is regenerated at the level of signal samples.

At step S724B refined channel estimation (complex phasor) for the decoded packet is performed based on the full packet (preamble plus data payload) in order to obtain a refined channel estimate 1190, similarly to step S726B described above.

At step S724C the regenerated version of the detected packet is adjusted by methods known to the expert of skill in the art, using the result of the refined channel estimation.

At step S724D the modulated symbol samples from the locally regenerated and adjusted packet replica are subtracted from the processing memory 1115 (or rather, from the signal samples stored therein) in order to cancel this packet replica, similarly to step S726D. This subtraction is performed at the interference cancellation processor 1120.

In addition to the elements mentioned and explained above, the demodulator 1100 further comprises a parallel-to-serial converter 1130, and a burst demodulator 1135.

In the above discussion of FIGS. 7 to 10, the order of respective method steps is not to be considered as limiting the present invention. Rather, the steps defined above can be performed in any order, as long as they do not require, as an input, an output of a preceding step. Also, it is to be noted that the above-described demodulator design and demodulator processing is the same for both so the ACRDA modulator baseline and its variant according to the first and second embodiments, respectively.

In the following, performance of the present invention and CRDSA in terms of throughput, packet loss ratio, and transmission latency will be discussed with reference to FIGS. 12 to 17.

A comprehensive ACRDA simulator has been developed following the RA scheme modulator and demodulator described above. All packets arrivals and associated virtual frames are asynchronous with random delays. The packet arrival process is assumed to have a Poisson distribution. When comparing ACRDA and CRDSA performances, unless stated otherwise, it is assumed that both ACRDA virtual frames and CRDSA frames are composed of 100 slots (i.e. $N_{slots}$=100), each slot containing 100 bit information packets. The 3GPP FEC rate r=⅓ is assumed jointly with Quadrature Phase-Shift Keying (QPSK) modulation. In general it is assumed as an example that the incoming packets' power is log normally distributed with zero mean and standard deviation a [dB]. The ratio $E_s/N_0$ in the absence of packet power fluctuations is assumed to be 10 dB, wherein $E_s$ is the power of the signal and No is the power of the noise. For the ACRDA detector (demodulator), unless stated otherwise, a window size of W=3 virtual frames and a window shift of ΔW=0.15 virtual frames are assumed. At each window shift, the ACRDA detector runs a maximum of 15 interference cancellation iterations, $N_{iter\ max}$=15.

Figure 12A:
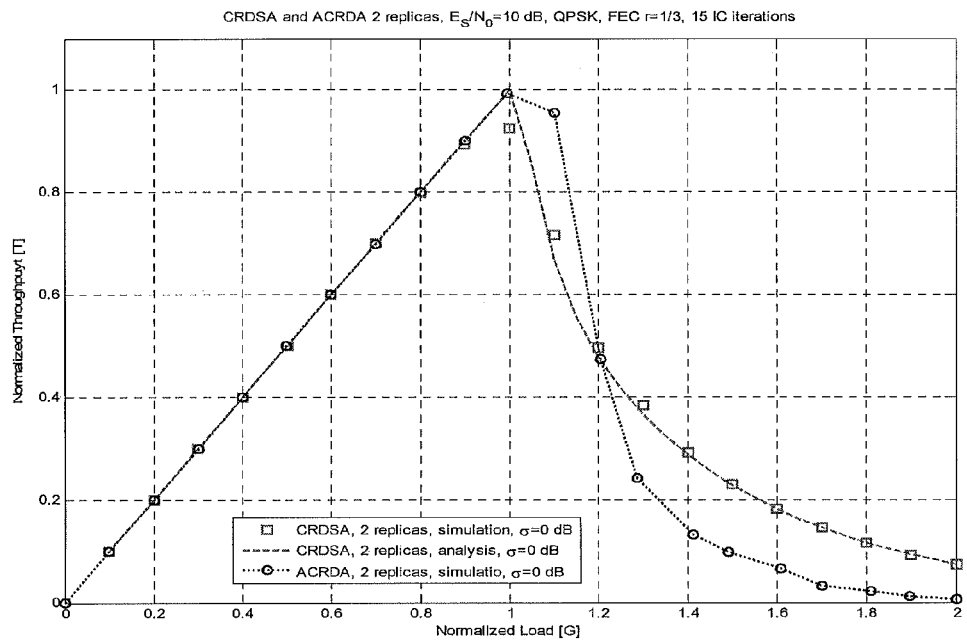
FIGS. 12A to 12F are graphs showing the performance of the invention and comparisons to the prior art.
Figure 12B:
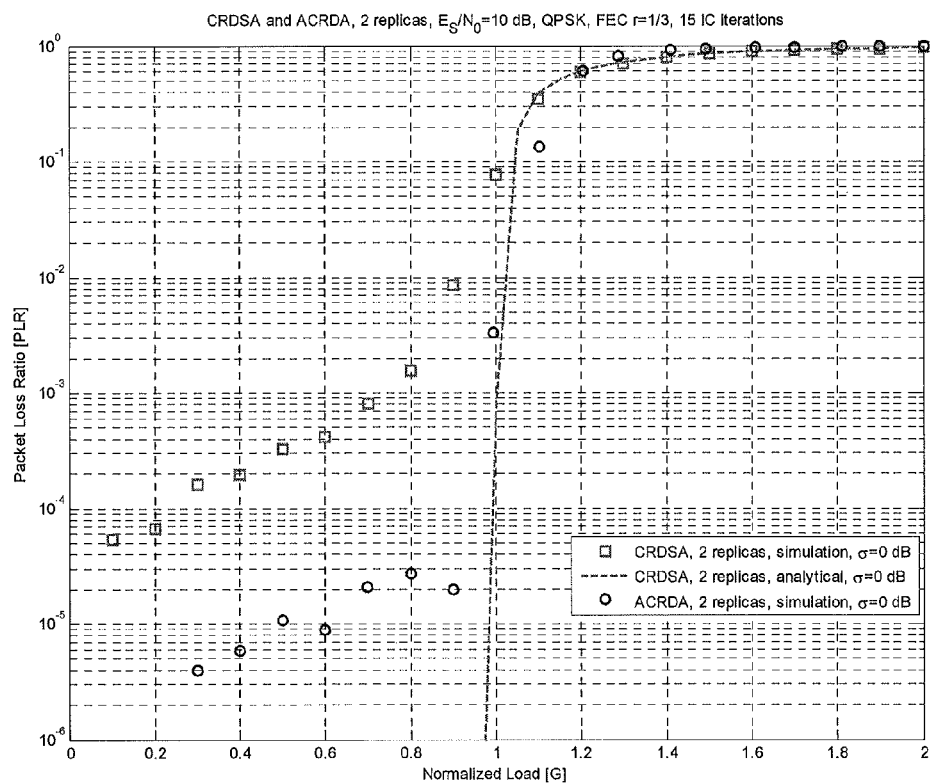

In FIGS. 12A and 12B the simulated performance of ACRDA is compared to that of CRDSA for the case of two replicas per packet to be transmitted, $N_{rep}$=2. FIG. 12A shows a comparison of ACRDA and CRDSA performance in terms of throughput. FIG. 12B shows a comparison of ACRDA and CRDSA performance in terms of PLR. The superior performance of ACRDA compared to CRSDA in case of two packet replicas is evident in particular in the low PLR region. Here, the loop probability is the main reason for the observed reduced slope PLR characteristic for CRDSA with two replicas. The asynchronous nature of the ACRDA scheme reduces the probability of occurrence of destructive loops, which is responsible for the PLR floor, also in case of equal-powered signals (σ=0 dB, no transmission power randomization). As a consequence, for ACRDA with two replicas the PLR floor is almost two orders of magnitude lower than for CRDSA. Thus, if the target PLR is $10^{-4}$ or higher, for ACRDA there is no need for increasing the number of replicas to three as would be the case for CRDSA.

Figure 12C:
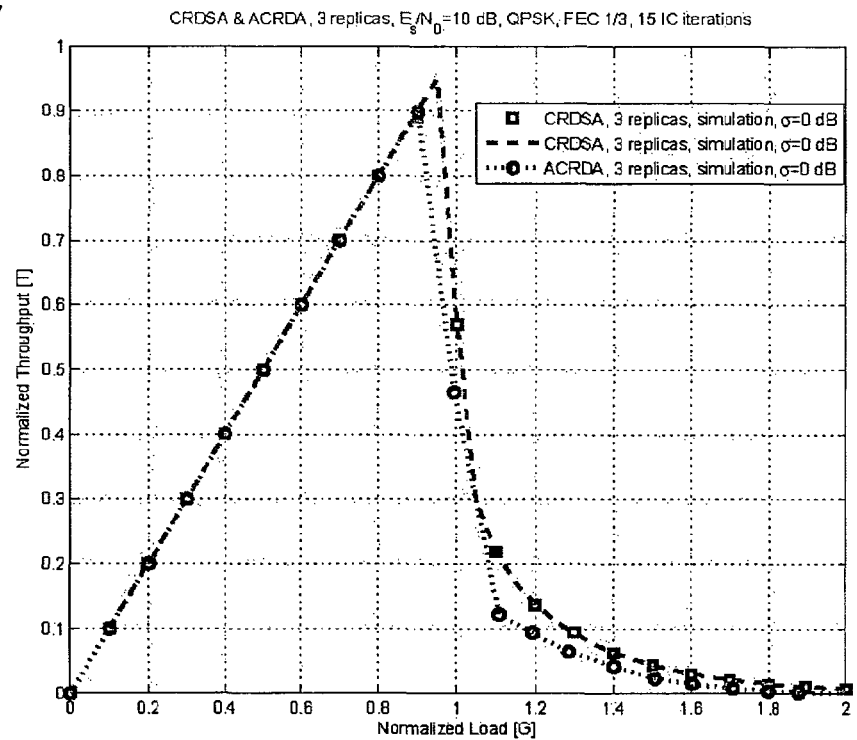
Figure 12D:
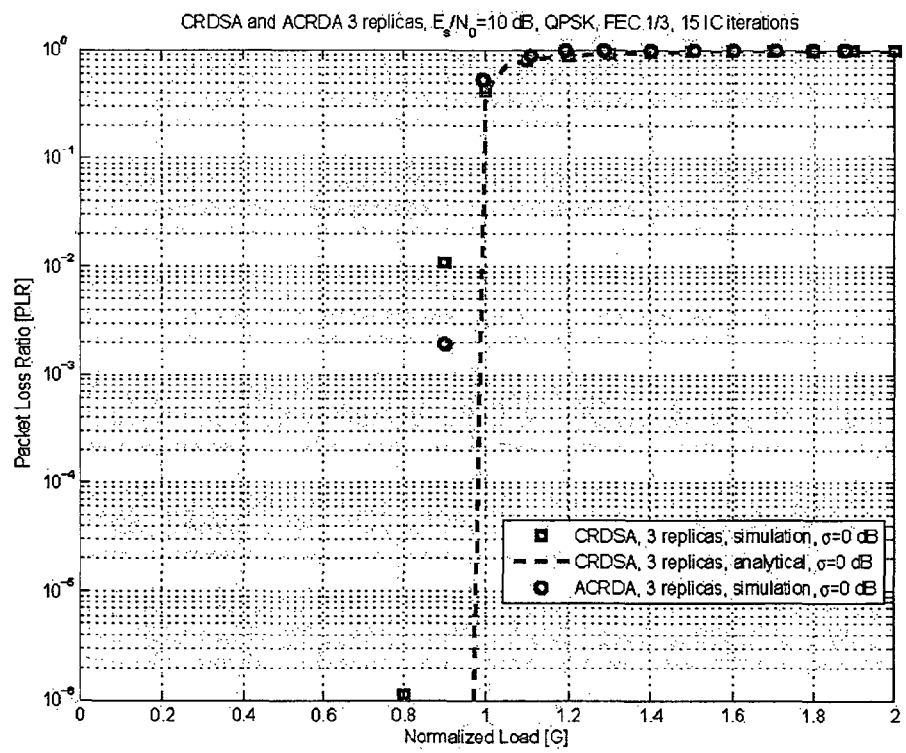

In FIGS. 12C and 12D the simulated performance of ACRDA is compared to that of CRDSA for the case of three replicas per packet to be transmitted, $N_{rep}$=3. FIG. 12C shows a comparison of ACRDA and CRDSA performance in terms of throughput. FIG. 12D shows a comparison of ACRDA and CRDSA performance in terms of PLR. In this case the loop event probability is very low also for CRDSA. Thus for the three replicas case, CRDSA has essentially the same PLR performance as ACRDA. This confirms the conjecture that the asynchronous interference nature in ACRDA and CRA has no impact on the RA throughput.

Figure 12E:
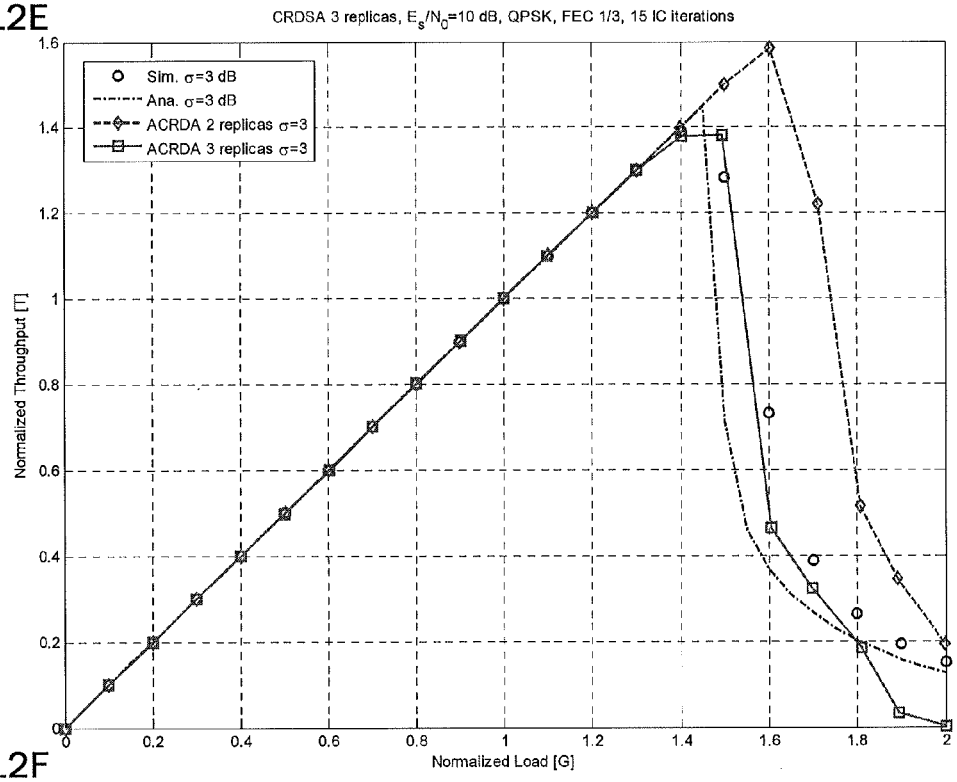
Figure 12F:
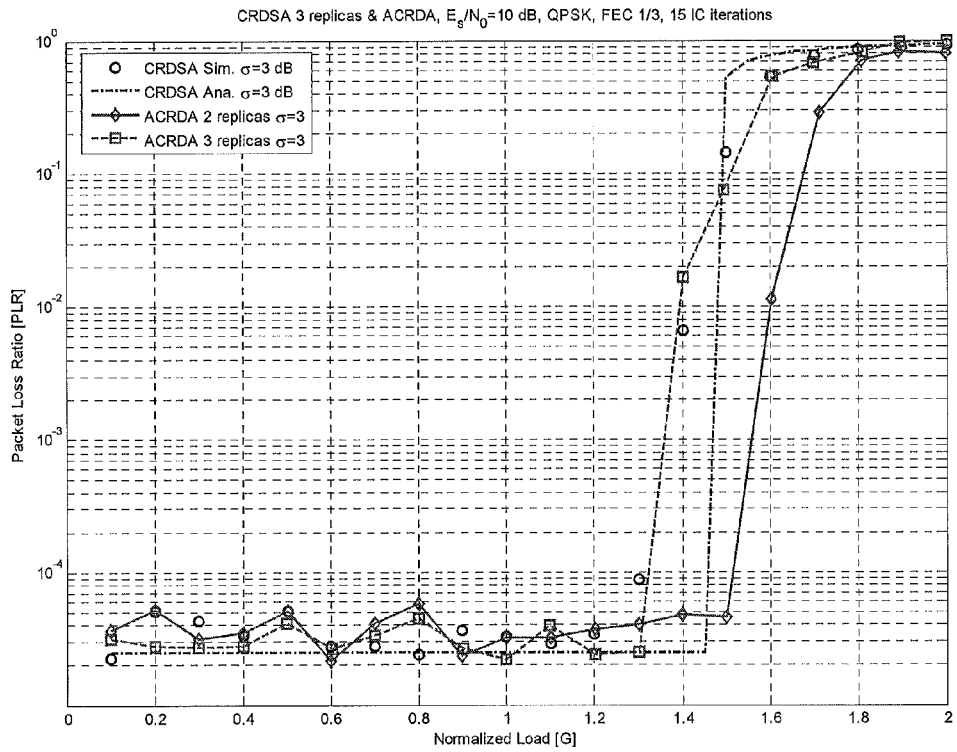

In FIGS. 12E and 12F the simulated performance of ACRDA for $N_{rep}$=2 is compared to that of CRDSA for $N_{rep}$=3, with a log normal packet power distribution with σ=3 dB. FIG. 12E shows the comparison in terms of throughput, while FIG. 12F shows the comparison in terms of PLR. It is apparent that for a PLR=$10^{-4}$, ACRDA has a 14% better throughput than CRDSA. The superior performance of ACRDA is obtained while operating in a truly asynchronous access mode instead of the slotted CRDSA mode. Furthermore, as discussed above, the fact that the number of ACRDA replicas can be reduced to $N_{rep}=2$ is reducing the demodulator complexity by an approximate 33% factor.

FIGS. 13A and 13B illustrate the impact of the gateway demodulator window memory size W on the performance of the ACRDA scheme. FIG. 13A illustrates the impact on throughput, while FIG. 13B illustrates the impact on the PLR. A window size W=3 virtual frames seems to be the optimum choice. As it is seen in FIG. 13A, reducing the ACRDA demodulator window size to W=2 virtual frames reduces the throughput performance at $PLR=10^{-4}$ by about 10%, while for W=1 virtual frames the performance loss becomes unacceptably large. A window size $2<W\leq3$ is therefore recommended, wherein the window size does not have to be an integer multiple of the size of the virtual frame.

Figure 14A:
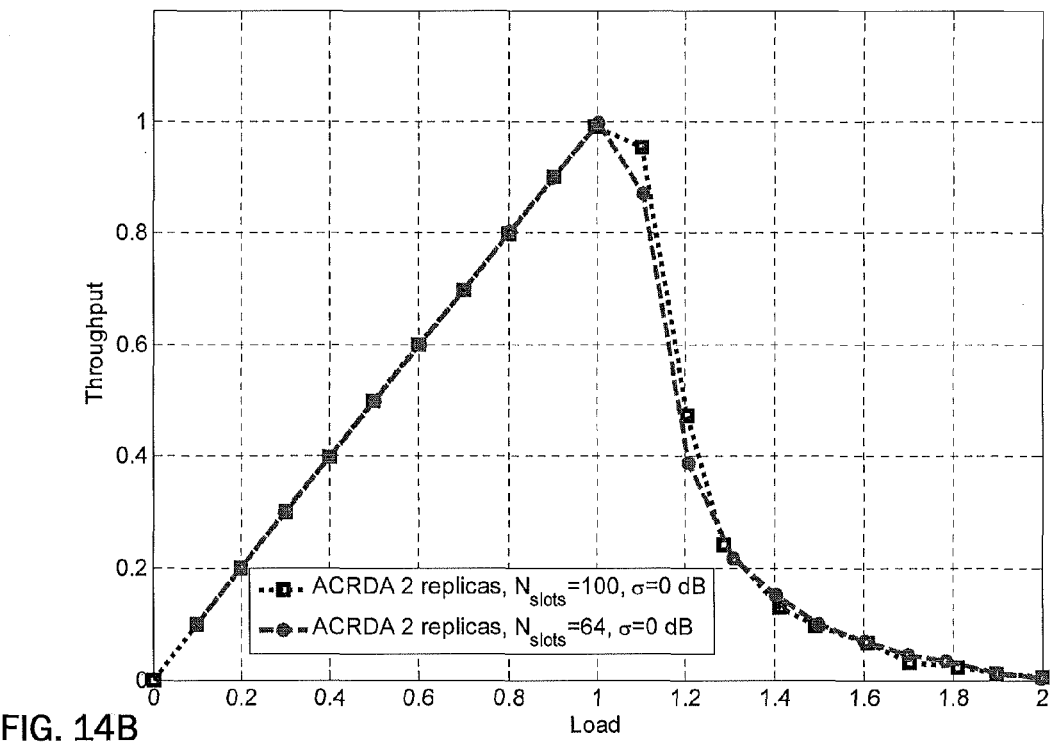
FIGS. 14A and 14B are graphs showing the dependence of the performance of the present invention on the number of slots per virtual frame.
Figure 14B:
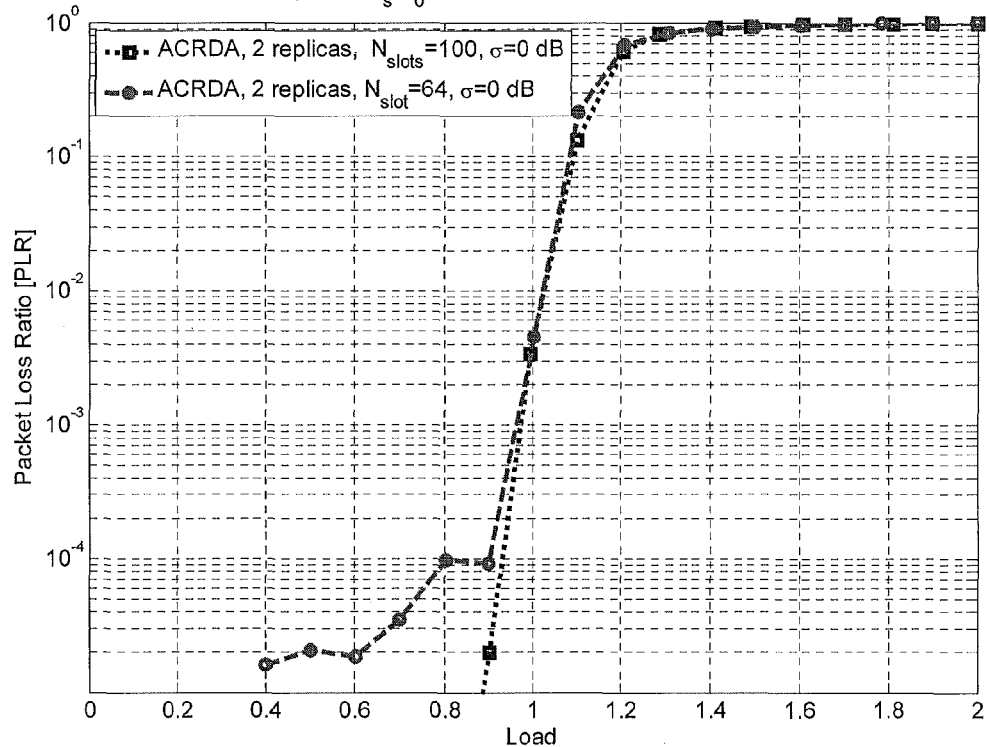

Another system parameter that impacts the protocol latency is the number of slots per frame, $N_{slots}$. In FIGS. 14A and 14B, performance of the ACRDA scheme for 64 slots per frame and for 100 slots per frame is compared. FIG. 14A illustrates the impact on throughput, while FIG. 14B illustrates the impact on the PLR. As anticipated, the reduction of the number of slots per frame is slightly increasing the loop occurrence probability. This explains the increase in the PLR floor around $10^{-4}$.

Figure 15A:
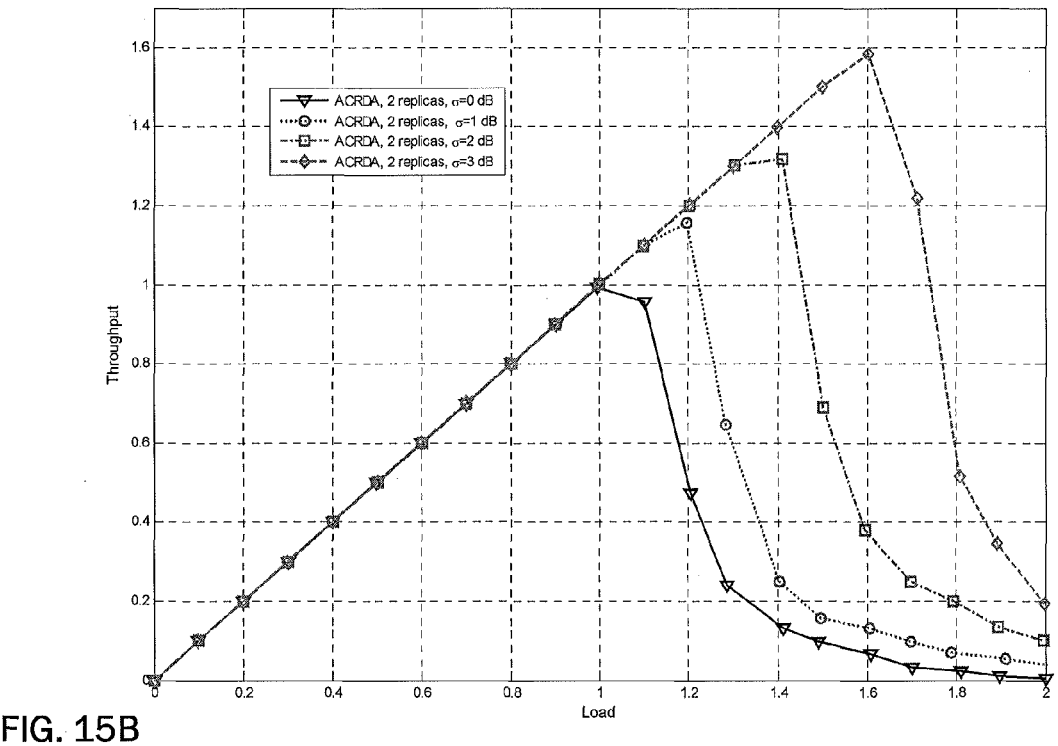
FIGS. 15A to 15H are graphs showing the dependence of the performance of the present invention on power randomization.
Figure 15B:
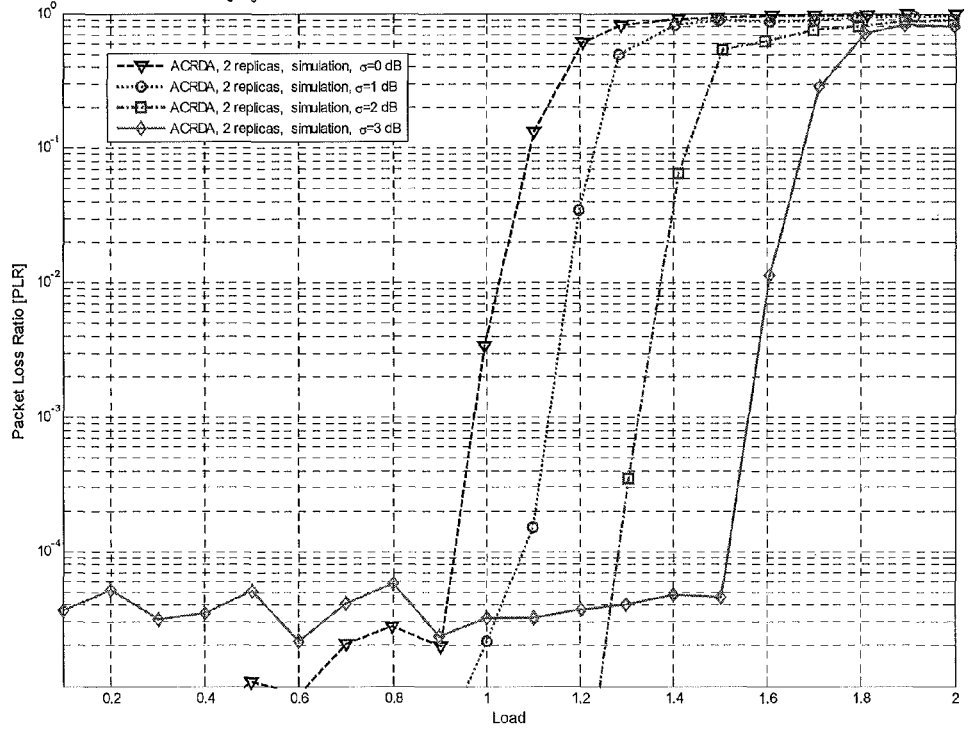
Figure 15C:
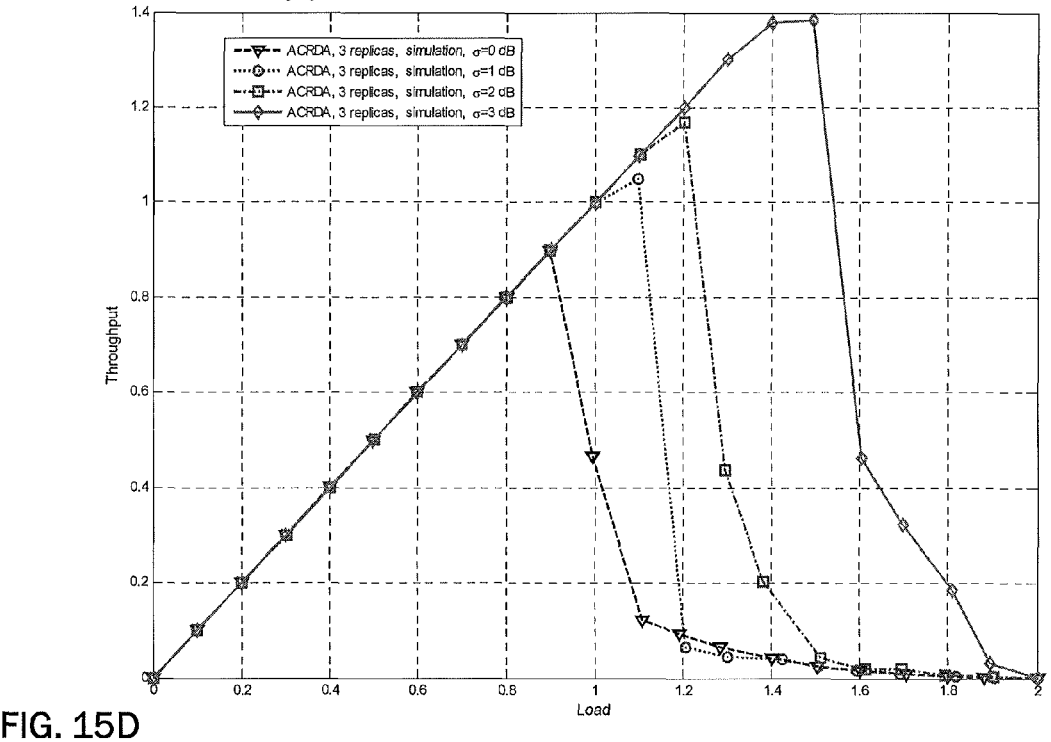
Figure 15D:
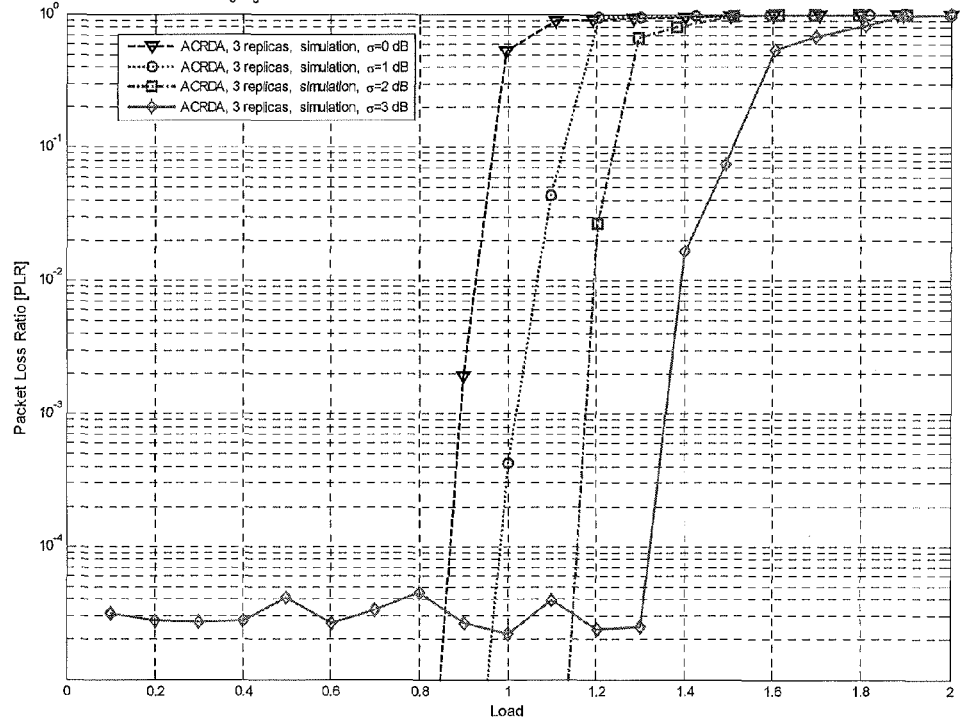

The impact of different log normal power fluctuation standard deviations σ on the performance of the ACRDA scheme is shown in FIGS. 15A and 15B for $N_{rep}=2$, and in FIGS. 15C and 15D for $N_{rep}=3$. FIGS. 15A and 15C illustrate the respective impact on throughput, while FIGS. 15B and 15D illustrate the respective impact on the PLR. As expected, ACRDA (similarly to CRDSA) benefits from an unbalanced packet power, which further boosts the RA throughput (cf. FIGS. 15A and 15C). As noted above, the use of three replicas instead of two in ACRDA slightly reduces the maximum throughput that can be attained. However, it allows for a drastic reduction in the PLR floor. The PLR floor shown for σ=3 dB and $N_{rep}=3$ is due to the Additive White Gaussian Nose (AWGN) thermal floor. This phenomenon is common to both ACRDA and CRDSA. A possible way to optimize the packet power randomization is described in R. De Gaudenzi, unpublished PCT Patent filing "Transmit Power Control in a Spread-Spectrum Unslotted Random Access Communication System", 2013, application number PCT/IB2013/000547, which is hereby incorporated by reference.

Figure 15E:
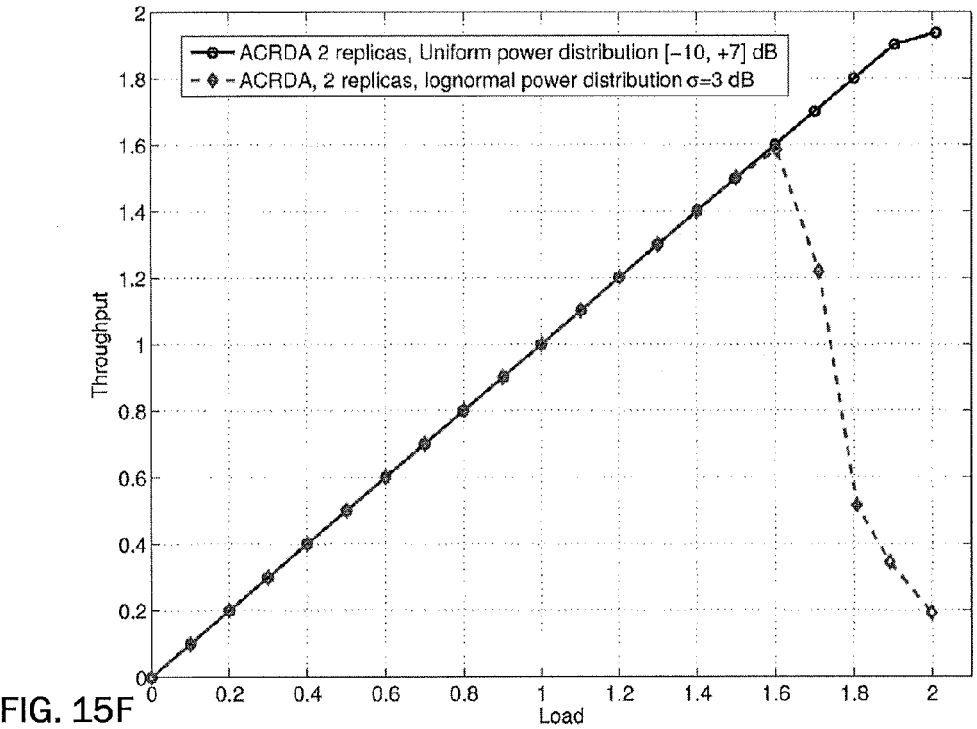
Figure 15F:
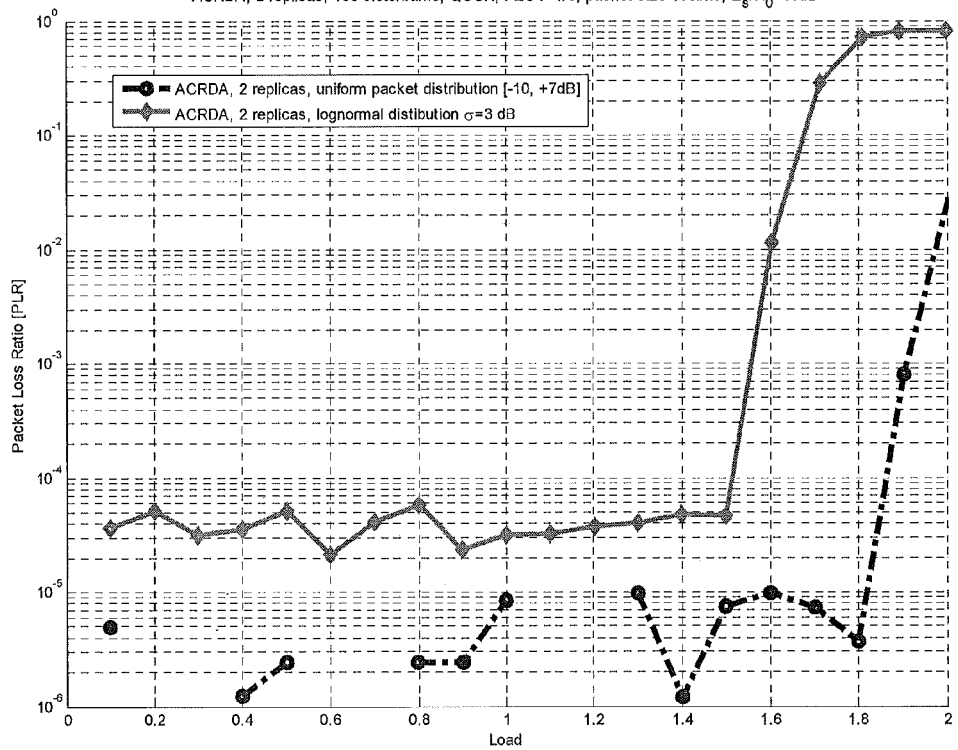

FIGS. 15E and 15F compare the performance of the ACRDA scheme for uniform (instead of log normal) power distribution in the range [−10,+7] dB and log normal power distribution with σ=3 dB. FIG. 15E illustrates the impact on throughput, while FIG. 15F illustrates the impact on the PLR. An increase of the ACRDA throughput up to 1.8 b/s/Hz for $PLR<10^{-4}$ has been observed using a uniform power distribution in dB spanning the range [−10, +7] dB around the nominal $E_s/N_0=10$ dB. The −10 dB lower power limit ensures that at this Signal-to-Noise Ratio (SNR) the packet can still be decoded in the absence of colliding packets. The +7 dB upper power limit is an arbitrary choice for the maximum extra received packet power compared to the nominal level and is close to the maximum log normal distribution 2σ level assumed above (i.e. 6 dB).

Figure 15G:
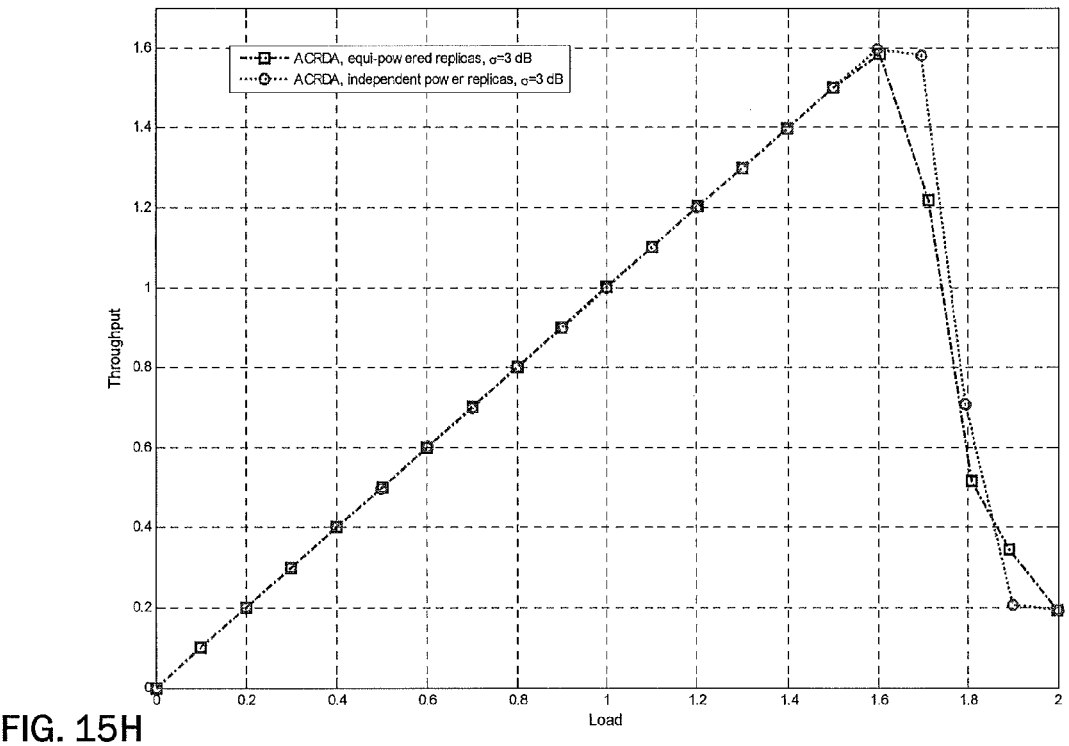
Figure 15H:
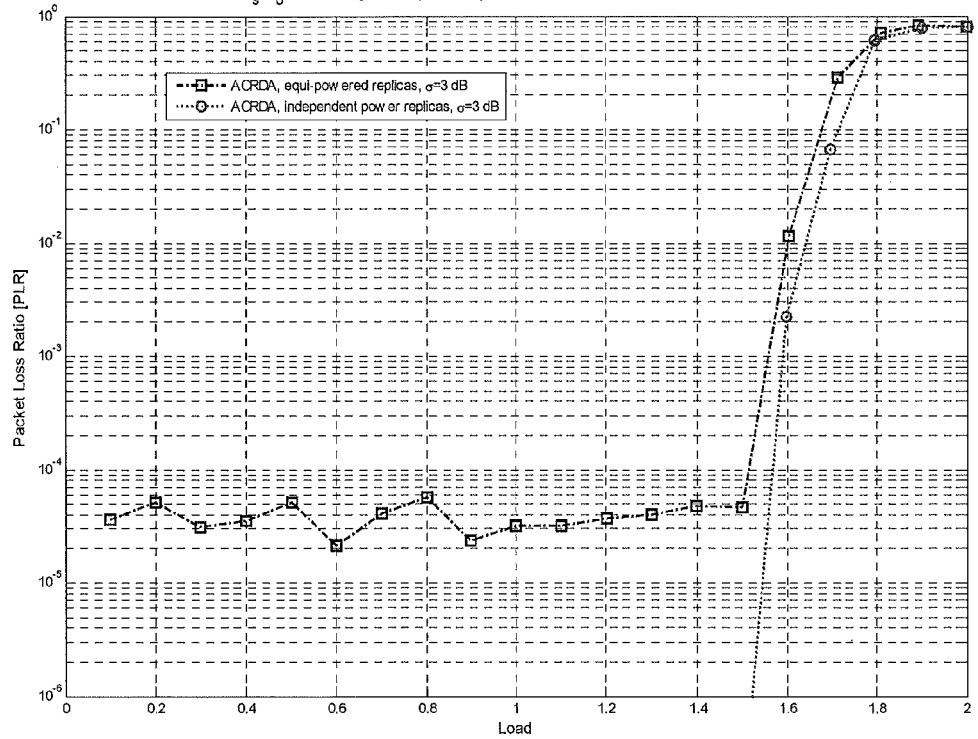

Given the positive impact of power imbalance on performance, one can think of artificially using a different realization of the packet power randomization process for each replica transmitted by the same user terminal according to the first and second embodiments. In this way further diversity is created among the replica packets in addition to the location within the virtual frame. As is illustrated in FIGS. 15G and 15H, this has a beneficial effect on the throughput (cf. FIG. 15G) but in particular on PLR performance (cf. FIG. 15H) for a log normal packet power distribution with σ=3 dB.

In the following, the delay performance of both ACRDA and CRDSA will be described, wherein ACRDA with two replicas and CRDSA with three replicas will be considered. Delay is measured packet-by-packet in the simulator as the time interval from the moment a packet is placed in the transmitter output buffer to the moment the packet is successfully decoded at the receiver. As such, the delay results do not contain the delay that may be induced by a congestion control mechanism that may run before the transmitter output. In order to present a fair and clear comparison between ACRDA and CRDSA, the delay results are expressed as normalized to the frame length, and they exclude the signal propagation delay between the transmitter and the receiver. Unless stated otherwise, the delay results are presented corresponding to the normalized MAC loads at which the PLR is less than or equal to $10^{-3}$.

Figure 16A:
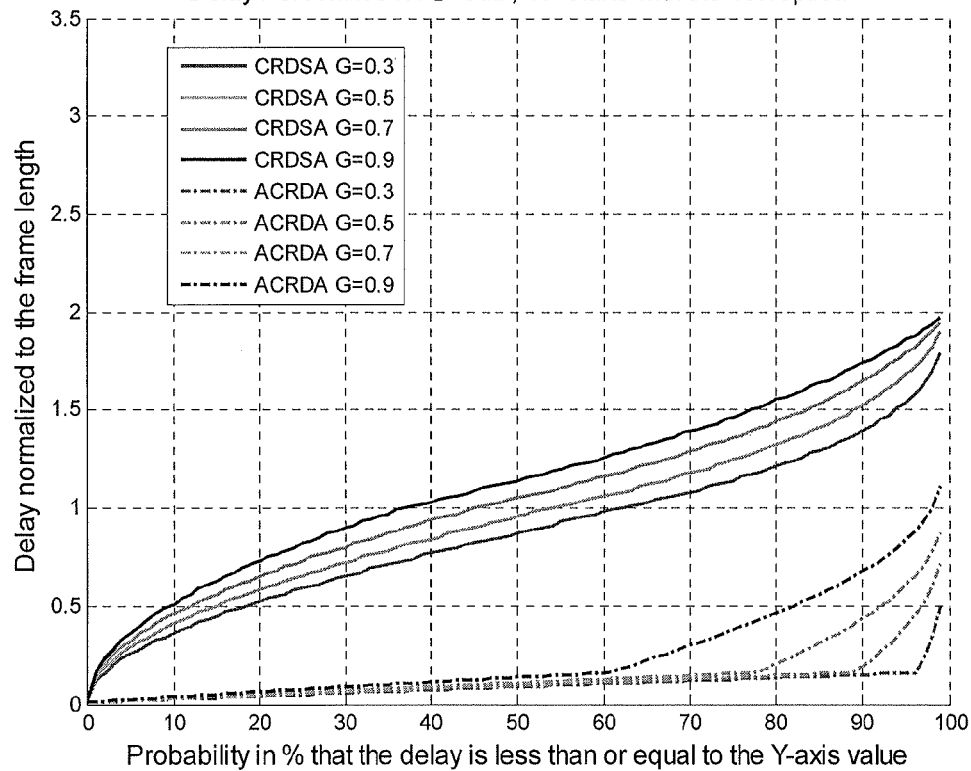
FIGS. 16A to 16D are graphs showing the performance of the present invention with regard to a transmission delay.
Figure 16B:
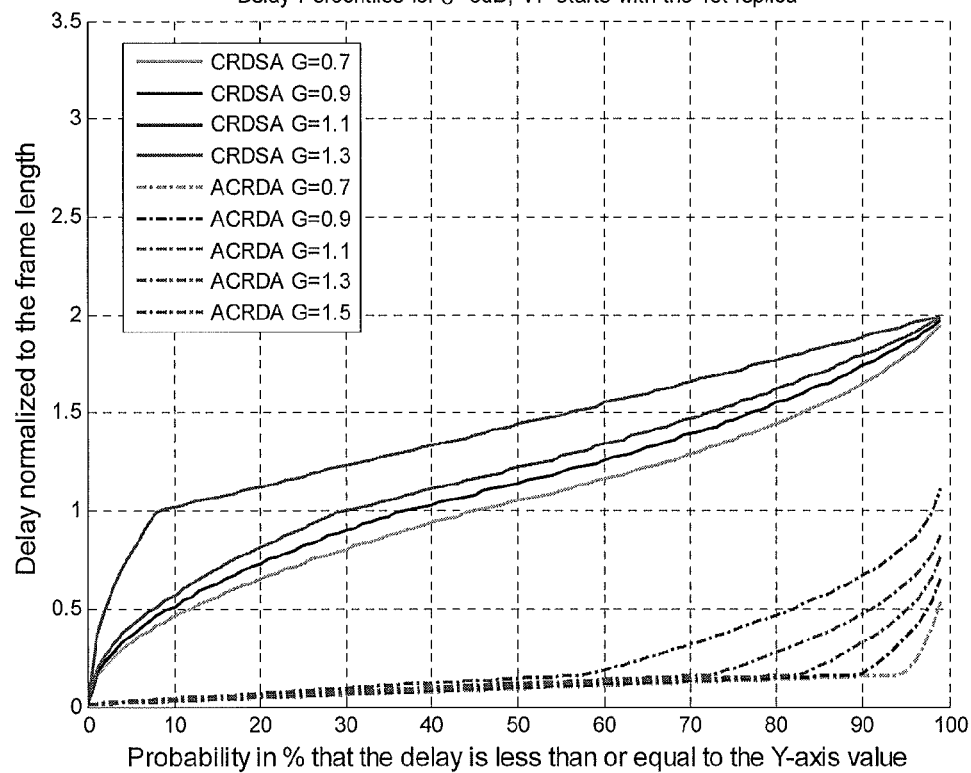
Figure 16C:
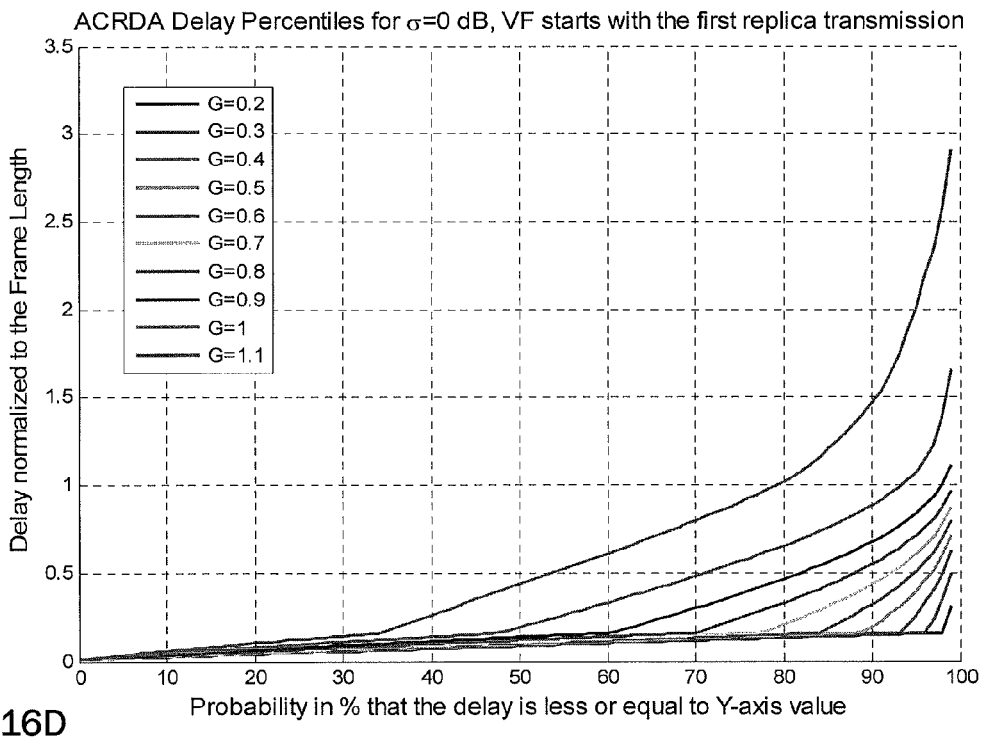
Figure 16D:
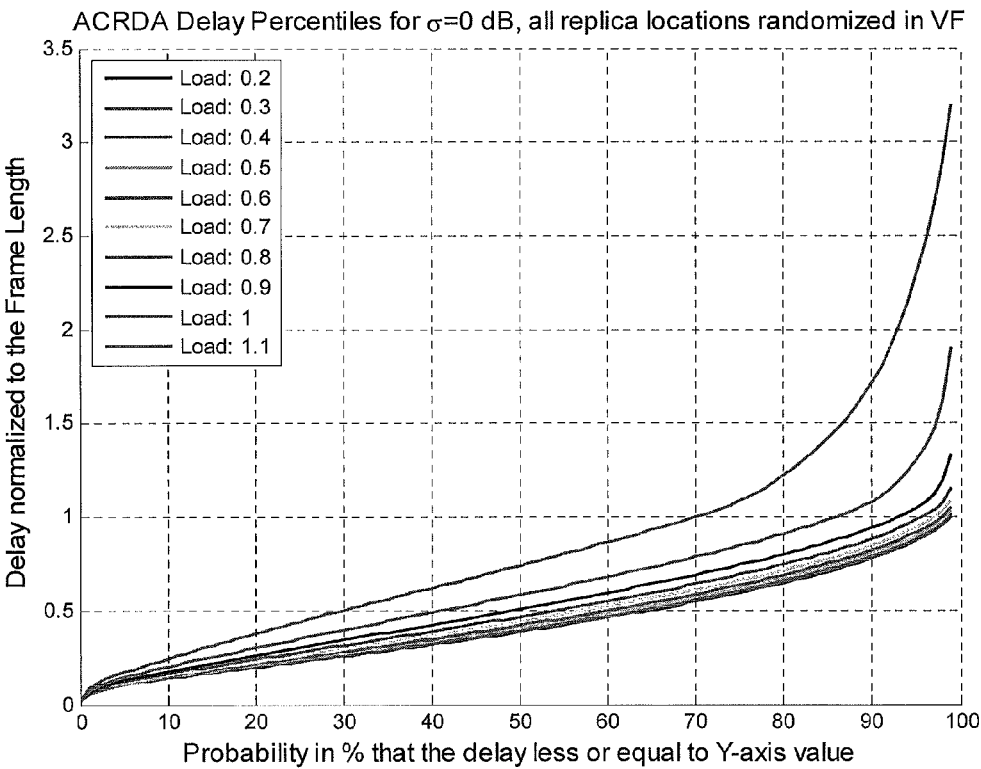

FIGS. 16A and 16B show transmission delays for the transmission method according to the second embodiment of the present invention (ACRDA variant), which dictates first replica transmission at the beginning of the virtual frame. Therein, FIG. 16A relates to a uniform power distribution (σ=0 dB) and FIG. 16B relates to log normal power distribution with σ=3 dB. FIGS. 16C and 16D show the delay for both ACRDA implementations according to the first and second embodiments of the present invention, wherein FIG. 16C relates to the second embodiment and FIG. 16D relates to the first embodiment.

FIG. 16A shows the CRDSA and ACRDA percentiles of the transmission delay for equal-powered packets and for various MAC loads. It clearly appears that for the 90% percentile the ACRDA delay is reduced by about a factor of 2.46 for a MAC load G=0.9 b/s/Hz up to more than a factor of 9 for G=0.3 b/s/Hz. FIG. 16B illustrates a case with log normal packet power distribution with o=3 dB. It is apparent that the ACRDA delay reduction with respect to CRDSA is comparable to the case of σ=0 shown in FIG. 16A.

FIGS. 16C and 16D show delay percentiles for both implementations of ACRDA. At the 90% percentile delay for G=0.9 b/s/Hz the baseline ACRDA (first embodiment) delay is reduced by a factor of 1.85 compared to CRDSA. The ACRDA variant (with first packet replica located at the beginning of the virtual frame; second embodiment) instead has a delay reduction factor of 2.64. For G=0.9 b/s/Hz, compared to CRDSA, the baseline ACRDA 90% delay percentile (cf. FIG. 16D) is lower by a factor of 1.85. Under the same conditions, the ACRDA variant (cf. FIG. 16C) results in a 90% delay percentile that is lower than that of CRDSA by a factor of 2.64. For G=0.3 b/s/Hz the ACRDA baseline delay reduction factor compared to CRDSA is limited to 1.78 (with respect to a factor of 9 in the ACRDA variant). Looking at the MAC access delay performance of ACRDA, the variant scheme (second embodiment) is definitely the preferable option. However, as discussed above, the latency performance shall in general be analyzed also taking into account congestion control algorithms and the type of traffic to be supported which may be of non Poisson nature.

Figure 17A:
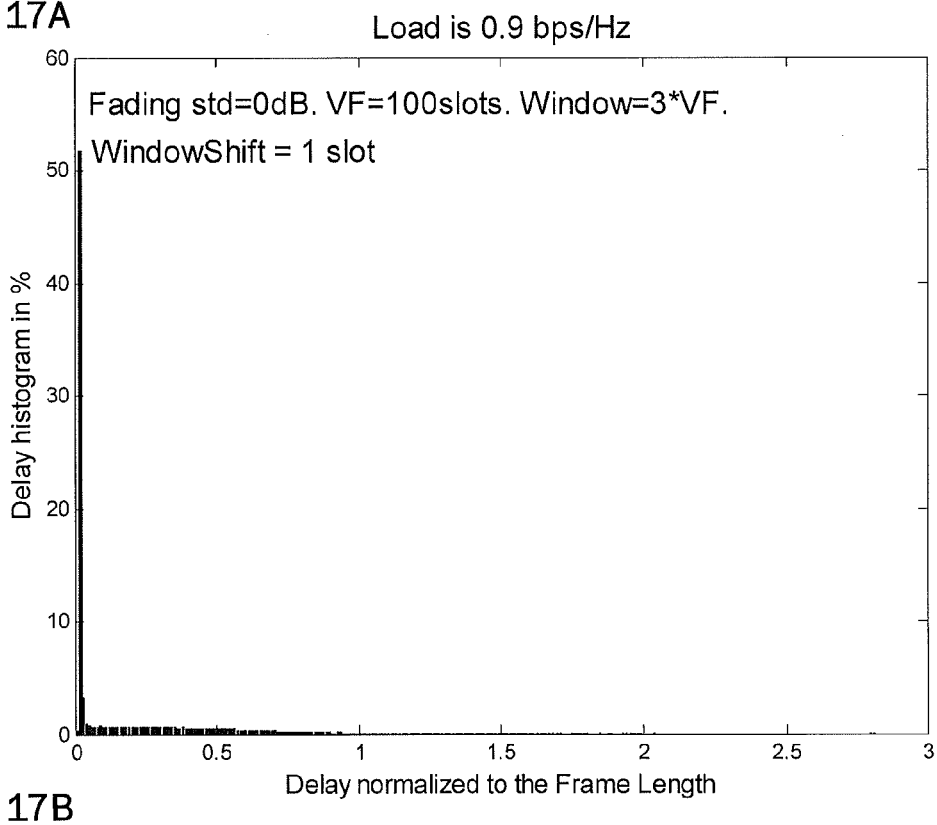
FIGS. 17A to 17C are graphs illustrating the performance of the second embodiment of the invention.
Figure 17B:
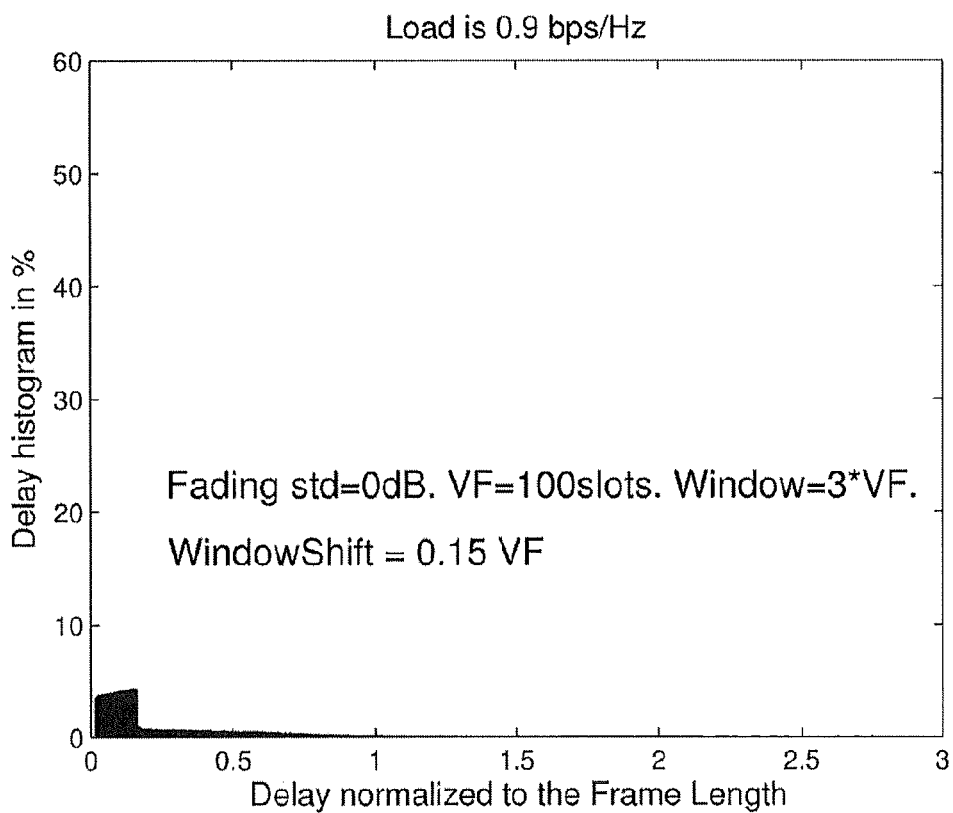
Figure 17C:
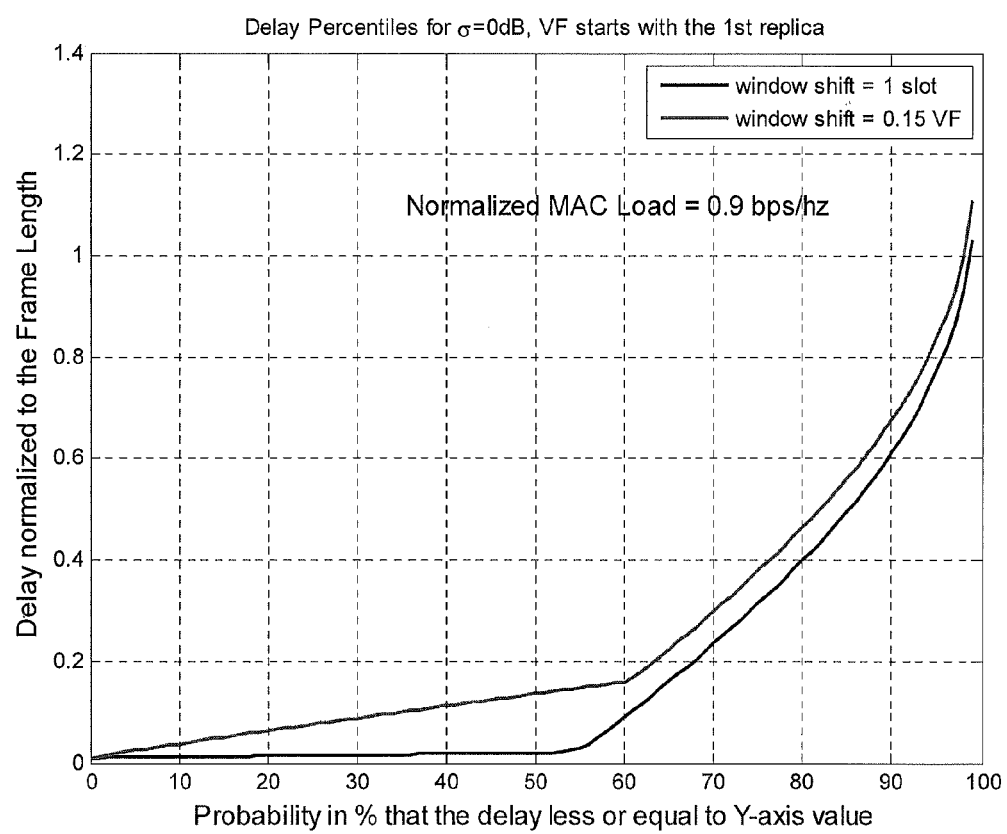

FIGS. 17A to 17C show delay histograms and delay percentiles for the ACRDA variant (second embodiment).

FIG. 17A shows a delay histogram for the ACRDA variant for a normalized MAC load of G=0.9 b/s/Hz at a bin size of 1 slot (i.e. 1/100 of a virtual frame in the current configuration). As can be seen, a significant fraction of delay samples fall within an interval equal to the Interference Cancellation (IC) window shift in the simulation ($T_{shift}=\Delta W \cdot T_{frame}$). This fraction corresponds to those packets of which the first replica is decoded successfully. However, because the IC window according to the simulation shifts with step size $\Delta W=0.15$ virtual frames, the transmission delay of these packets is uniformly distributed within the window shift interval. Then, there are those packets of which the second replica is decoded successfully in the first attempt. The second replicas are distributed randomly in time in the virtual frame. Thus, these packets correspond to access delay measurements that are between 0.15 and one virtual frame in FIG. 17A. The delay measurements beyond one virtual frame correspond to those packets of which replicas are only decoded after execution of successive interference cancellation. As such, these delay measurements can be as long as the window depth, which in the simulation is three virtual frame lengths. FIG. 17B shows the delay histogram for the same configuration, except for a window shift of $\Delta W=0.01$ virtual frames (i.e. one slot) instead of $\Delta W=0.15$ virtual frames. In line with expectation, in this case more than 50% of packet delays take one slot duration. FIG. 17C shows the delay percentiles corresponding to the above window shift configurations $\Delta W=0.15$ virtual frames and $\Delta W=0.01$ virtual frames. At the 90% percentile, the improvement that could be achieved by reducing $\Delta W$ to 0.01 virtual frames (i.e. one slot) from $\Delta W=0.15$ virtual frames is only a factor of 1.09.

Next, making reference to FIGS. 18 to 21, a computation of the analytical performance of the ACRDA scheme will be performed and the results will be compared to those obtained by the above simulation.

In order to derive the ACRDA analytical performance, first the probability density function (pdf) for the number of packets colliding with the desired one needs to be derived. Taking a time window of plus or minus a packet around the desired packet p in FIG. 18, it is observed that the total number $k_t$ of packets colliding with the desired one can be represented by the sum of two random variables (rv), $$k_t=k_b+k_a, \quad (1)$$

wherein $k_b$ and $k_a$ respectively represent the number of colliding packets before and after the desired packet p. Assuming that packets are generated according to a Poisson distribution, $k_b$ and $k_a$ are two Poisson random variables with intensity $\lambda_p=G \cdot G_p \cdot N_{rep}$, while $k_t$ is a Poisson random variable with intensity $$\lambda_t=2\lambda_p=2G \cdot G_p \cdot N_{rep}. \quad (2)$$

G is defined as the MAC load expressed in information bits/s/Hz. The processing gain $G_p$ is defined as $G_p=R_s/R_b=1/(r \cdot \log_2 M)$, where $R_s$ is the channel baud rate, $R_b$ is the information bit rate, r is the FEC scheme coding rate and M is the modulation cardinality. As above, $N_{rep}$ represents the number of replicas that are transmitted for each packet. Therefore, $\lambda_p$ represents the average number of packet arrivals over one packet duration and $\lambda_t$ represents the average number of packet arrivals over the ±1 packet window (cf. FIG. 18) and is exactly $2\lambda_p$. The Poisson random variable discrete pdf is given by $$f_K(k; \lambda_t) = \frac{\lambda_t^k \exp(-\lambda_t)}{k!}. \quad (3)$$

Figure 18:
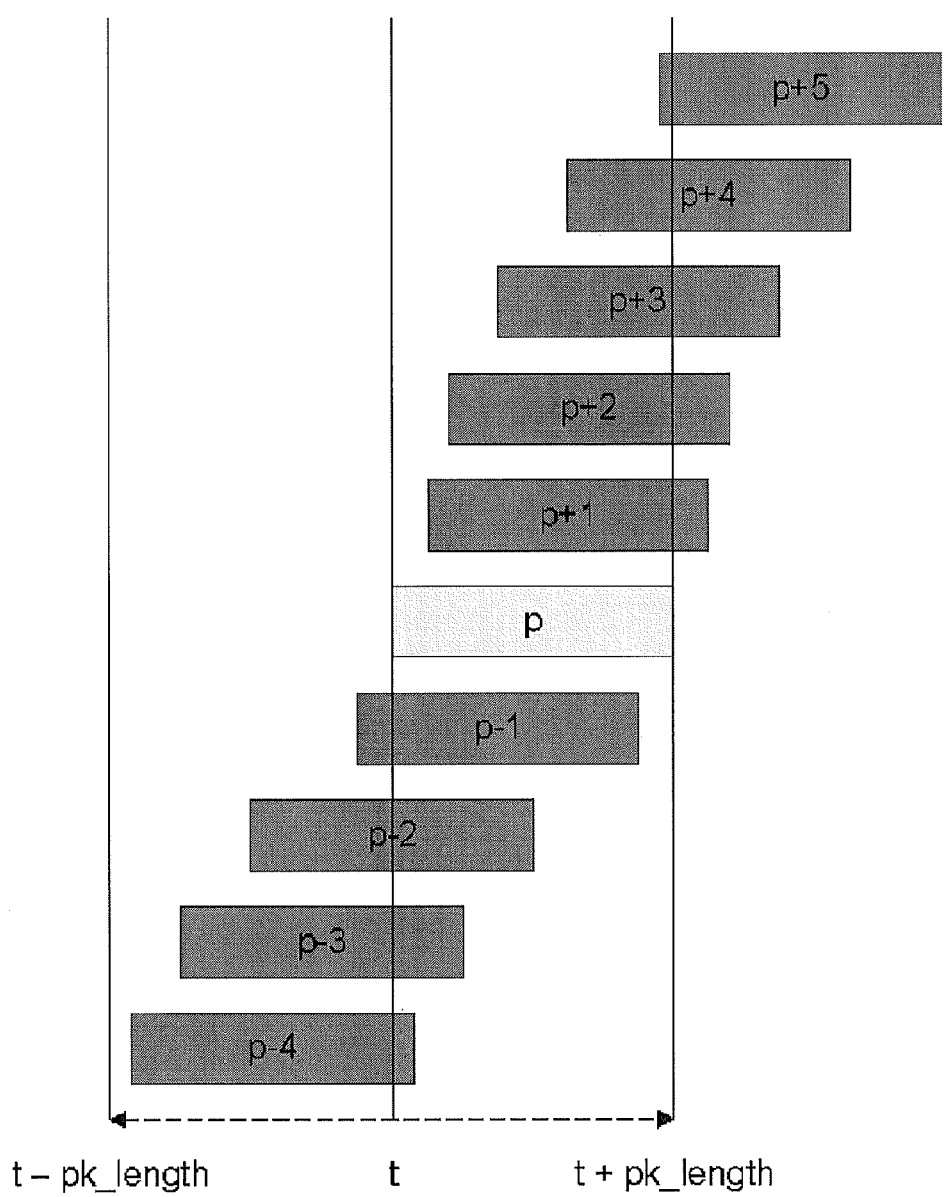
FIG. 18 is a schematic diagram showing packets arriving at the demodulator.

As shown in FIG. 18, the interference is coming from asynchronous packets that might only partially overlap the packet of interest. In the general case, this will generate a time-dependent interference component that is a function of the number of interfering packets at each time instant (cf. FIG. 19). For the purpose of this analytical calculation, the average interference (gray dash-dotted line) generated over the desired packet will be considered. This assumption can be justified by the fact that the block FEC scheme performance will be essentially driven by the average signal-to-noise ratio experience for the received packet. Assuming k equal-power packet arrivals interfering with the desired packet, as shown in equation (3), the resulting interference to noise Power Spectral Density (PSD) ratio can be approximated as the sum of k uniform random variables distributed from 0 to $\chi_i$ (0 meaning no overlap and $\chi_i$ meaning full overlap with the desired packet), where $\chi_i$ is the interference to noise PSD ratio $\chi_i=I_0/N_0$ of the interfering packet and can be derived as $\chi_i=\omega/G_p$, where $\omega=E_b/N_0$ is the energy per bit to noise power spectral density and $G_p$ is the processing gain. The sum of the k uniform distributions results in an Irwin-Hall distribution (cf. J. O. Irwin, "On the Frequency Distribution of the Means of Samples from a Population Having any Law of Frequency with Finite Moments, with Special Reference to Pearson's Type II", Biometrika, Vol. 19, No. 3/4, 1927, pp. 225-239, and P. Hall, "The Distribution of Means for Samples of Size N Drawn from a Population in which the Variate Takes Values Between 0 and 1, All Such Values Being Equally Probable", Biometrika, Vol. 19, No. 3/4, 1927, pp. 240-245) with mean $$\mu_\chi = \frac{k}{2} \cdot \frac{\omega}{G_p},$$

variance $$\sigma_\chi^2 = \frac{k}{12}\left(\frac{\omega}{G_p}\right)^2$$

and the probability density function $$f_\Xi(\chi; k) = \quad (4)$$

$$\frac{1}{2(k-1)!} \cdot \frac{G_p}{\omega} \sum_{n=0}^{k} (-1)^n \binom{k}{n}\left[\chi \cdot \frac{G_p}{\omega} - n\right]^{k-1} \text{sign}\left\{\chi \cdot \frac{G_p}{\omega} - n\right\},$$

where sign {·} denotes the sign function.

With regard to the replicas of the desired and interfering packets, two situations can occur. In the general case the different replicas of the desired packet will have uncorrelated interfering packets as shown in FIG. 3. But in the worst case, the location of the replicas of the interfering packets will be correlated with the desired packet, i.e. they will have the same offset $\Delta_{slots}$, as shown in FIG. 20. In such situations a loop occurs in the recursive interference cancellation process, as the replicas of the interfering packets collide with the replicas of the desired packet, and the benefits of the spatial diversity are mitigated. More complex loops can occur when replicas from three or more users are chained together in pairs forming a longer loop (worm effect), but will not be considered here as their probability of occurrence is at least one order of magnitude lower compared to the two replicas case. Assuming that k packets are colliding with the desired packet, next the probability $P_{loop}^K(l)$ to have l loops with l being an integer and $0 \leq l \leq k$ will be derived. $P_{loop}^K(0)$ corresponds to the probability that none of the k interfering packets has a loop with the desired packet (i.e. no loops). The number of different combinations that occur when the remaining ($N_{rep}-1$) replicas are transmitted in the remaining ($N_{slots}-1$) slots of the virtual frame can be simply computed as $$N_c = \binom{N_{slots}-1}{N_{rep}-1},$$

wherein $$\binom{n}{k} = \frac{n!}{k!(n-k)!}$$

is the binomial operator. Therefore, the probability that an interfering packet selects the same combination of slots in the virtual frame than the desired packet for the remaining ($N_{rep}-1$) packets is $p=1/N_c$. Given k interfering packets and the probability p that the same combination of slots is selected, the probability $P_{loop}^K(l)$ to have l loops can be simply derived as a binomial distribution:

$$P_{loop}^K(l; k, p) = \binom{k}{l} \cdot p^l \cdot (1-p)^{k-l}. \tag{5}$$

Therefore, the general probability to have l loops regardless of the number of collisions can be derived as $$P_{loop}(l; G, N_{rep}, N_{slots}) = \Sigma_{k=0}^{\infty} P_{loop}^K(l; k, p) \cdot f_K(k; \lambda_t). \tag{6}$$

Now the ACRDA analytical performance will be derived by using a random access analytical framework for slotted systems and extending it to the asynchronous case, wherein the derivation will be limited to the case of equal power packets. Since not all types of loops will be taken into account, only an approximation of the PLR will be derived. The general expression for the ACRDA packet loss ratio can be derived as $$PLR(G,N_{rep},N_{slots}) \cong [PLR^{Niter}(G,N_{rep})]^{Nrep} \cdot P_{loop}(0;G,N_{rep},N_{slots}) + \Sigma_{l=1}^{\infty}[PLR_{loop}(l)]^{Nrep} \cdot P_{loop}(l;G,N_{rep},N_{slots}), \tag{7}$$

where $P_{loop}(l)$ represents the probability to have l loops and has been previously derived in equation (6), $PLR^{Niter}$ is the PLR expression when no loops are present at $N_{iter}$ interference cancellation and $PLR_{loop}(l)$ is the PLR expression when l loops are present. A generalized random access model without interference cancellation will be used for the assessment of $PLR_{loop}(l)$ and a generalized random access model with interference cancellation will be used for the assessment of $PLR^{Niter}$, but adapted to the asynchronous scenario. The methodology is derived extending former work related to slotted SA, DSA and CRDSA RA schemes described in O. del Río Herrero, R. De Gaudenzi, "Gener-alized Analytical Framework for the Performance Assessment of Slotted Random Access Protocols", submitted to IEEE Trans. on Wireless Comm., 2013.

First, an expression for $PLR_{loop}(l)$ will be derived. The probability of loss of the desired packet in the presence of l loops is approximated by $$PLR_{loop}(l) \cong \int_0^{\infty} \Gamma\left(\frac{\omega}{1+\chi}\right) \cdot f_{\Xi}(\chi; l) \cdot d\chi, \tag{8}$$

where $f_{\Xi}(\chi; l)$ is the PDF for the interference to noise Power Spectral Density (PSD) ratio $\chi=I_0/N_0$ when there are l colliding packets and has been defined in equation (4). The noise power spectral density $N_0$ is constant, but the interference power spectral density $I_0$ is a random variable since it is the result of the sum of l colliding packets over the desired packet each with a random time offset value. $\Gamma(x)$ is a polynomial interpolation of the coded modulation Packet Error Rate (PER) curve for a given channel code as a function of the argument $x=E_b/N_0$ in dB. In this model equation (8) it has been assumed that the multiple access interference (MAI) behaves as additive white Gaussian noise (AWGN). In general, the approximation is loose when there are few colliding packets. Although this approximation cannot be rigorously justified, the accuracy of this approach has been established by the inventors.

Second, an expression for $PLR^{Niter}(G, N_{rep})$ will be derived. ACRDA implements an iterative interference cancellation process within a sliding window position. Therefore, once the window has been processed as described above, some packets interfering with the desired packet will have been recovered due to the IC process across the window. Here an iterative model is introduced where $N_{iter}$ represents the window processing iteration number and it is considered that the IC process takes place at the end of each window processing iteration. It is found that $$PLR^{Niter}(G,N_{rep})=\Sigma_{k=0}^{\infty} P_{loss}^{K,Niter}(k) \cdot f_K(k;\lambda_t) \tag{9}$$

where $P_{loss}^{K,Niter}(k)$ is the probability for loss of the desired packet when there are k colliding packets at interference cancellation iteration $N_{iter}$ and $f_K(k; \lambda_t)$ is the probability mass function for the packet arrivals as defined in equation (3).

Considering that the detection of the different replicas of a packet are independent of each other (i.e. no loops can take place), then all replicas of the packets interfering with the desired packet that are present in other locations of the window will follow the same $PLR^{Niter}(G, N_{rep})$ as for the desired packet given by equation (9). As a result, after each window processing iteration, some of the k packets interfering with the desired packet may be cancelled because one of their ($N_{rep}-1$) other replicas has been successfully decoded. The IC of interfering packets due to successful detection of one of their replicas at each window processing iteration is accounted for by $$P_{loss}^{K,Niter}(k)=\Sigma_{r=0}^{k} P_{loss}^R(r) \cdot f_R(r;k,q),$$

$$q=[PLR^{Niter-1}(G,N_{rep})]^{Nrep-1} \tag{10}$$

where $P_{loss}^R(r)$ is the probability of loss when there are still r residual interfering packets over the desired packet at IC iteration $N_{iter}$, and $f_R$ is a binomial distribution where the number of trials is k and the probability of success q is derived from the PLR of the previous IC iteration given by equation (9). It shall be noted that here a recursive equation has been introduced in order to take into account the iterative IC processing within the window and PLR$^{N_{iter}}$ shall be initialized to 1 when N$_{iter}$=0. The probability of loss of the desired packet in the presence of r colliding packets can be simply calculated in the same way as it has been done in equation (8), namely $$P_{loss}^R(r) = \int_0^\infty \Gamma\left(\frac{\omega}{1+\chi}\right) \cdot f_\Xi(\chi; r) \cdot d\chi. \qquad (11)$$

Figure 21:
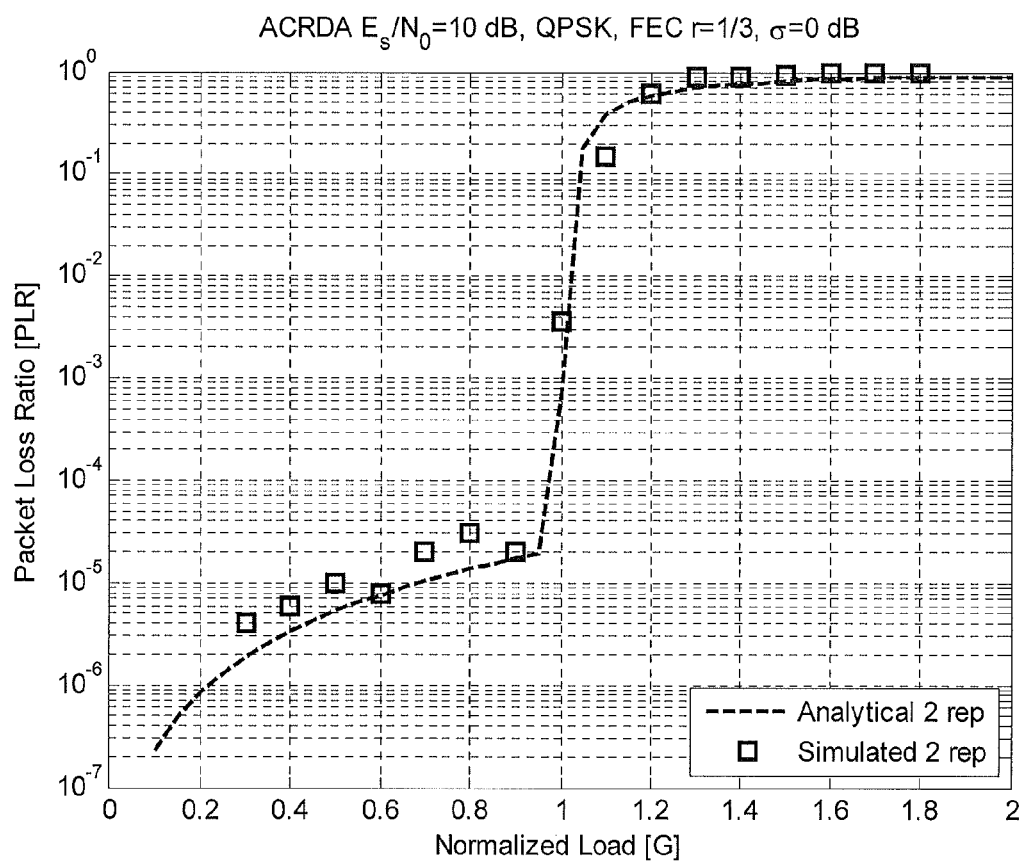
FIG. 21 is a graph showing a comparison between analytical and simulated performance of the present invention.

Finally, the PLR analytical results for ACRDA with two replicas under equal power conditions in comparison to the simulated results are presented in FIG. 21. As can be seen there is a very good match between the analytical model and the above-described results obtained through simulation.

Features, components and specific details of the structures of the above-described embodiments may be exchanged or combined to form further embodiments optimized for the respective application. As far as those modifications are readily apparent for an expert skilled in the art, they shall be disclosed implicitly by the above description without specifying explicitly every possible combination, for the sake of conciseness of the present description.

What is claimed is:

1. A method of transmitting data packets over a transmission channel shared by a plurality of transmitters, wherein transmission proceeds on the basis of a first unit of transmission of fixed length that is subdivided into a plurality of second units of transmission of fixed length, the method comprising:
    a) associating, at a first transmitter, for each packet to be transmitted at least two replicas of the packet with respective second units of transmission within a current first unit of transmission;
    b) generating, at the first transmitter, the at least two replicas, wherein in each of the at least two replicas signaling information is included, the signaling information indicating relative positions of the other replicas of the same packet within the current first unit of transmission with respect to a given replica;
    c) setting, at the first transmitter, a start timing for beginning transmission of the current first unit of transmission independently of the other transmitters of the plurality of transmitters sharing the transmission channel; and
    d) transmitting the at least two replicas at respective timings in accordance with their association with the respective second units of transmission within the current first unit of transmission,
    wherein in c), the start timing is set such that there may occur a situation in which, at a time of reception at a shared receiver associated with the communication channel, an offset in the time domain between the current first unit of transmission and a first unit of transmission transmitted by a second transmitter of the plurality of transmitters is not an integer multiple of the length of the first unit of transmission.

2. The method according to claim 1, wherein in c), the start timing is set a predetermined or random duration after generation of the at least two replica at b) has been completed.

3. The method according to claim 1, wherein in c), the start timing is set without synchronization with a shared receiver associated with the communication channel.

4. The method according to claim 1, wherein the signaling information indicates the relative positions of the other replicas of the same packet with respect to the given replica in terms of an integer number of second units of transmission.

5. The method according to claim 1, wherein in b), exactly two replicas are generated.

6. The method according to claim 1, further comprising:
    setting a power of transmission for the current first unit of transmission in accordance with a randomization scheme,
    wherein in d) transmission of all replicas that are associated with second units of transmission of the current first unit of transmission is performed in accordance with the power of transmission.

7. The method according to claim 1, further comprising:
    for each of the generated replicas, setting a power of transmission in accordance with a randomization scheme, so that when there are Nrep generated replicas, Nrep independent powers of transmission are set,
    wherein in d) transmission of each of the Nrep generated replicas is performed in accordance with the respective one of the Nrep independent powers of transmission.

8. The method according to claim 1, wherein in a) a first one of the two or more replica is associated with the earliest second unit of transmission within the current first unit of transmission.

9. The method according to claim 1, wherein in a) a first one of the two or more replica is associated with a second unit of transmission within the current first unit of transmission in accordance with a congestion control policy.

10. An apparatus for recovering, at a receiver, data packets transmitted over a transmission channel shared by a plurality of transmitters by the method according to claim 1, the apparatus comprising:
    a processing memory which is of FIFO type and has an entry side and an exit side, wherein a length of the processing memory corresponds to a length in the time domain that is larger than the length of the first unit of transmission;
    means for storing signal samples obtained in order from a received signal in the processing memory;
    means for sequentially scanning the processing memory for identifying and decoding replicas in the processing memory that are not affected by destructive collisions with replicas of other packets, locating other replicas of the same packet by using the signaling information included in the decoded replicas, performing interference cancellation by cancelling the located other replicas from the processing memory if they are affecting replicas of other packets by destructive interference, and identifying and decoding other replicas which, after the interference cancellation, are no longer affected by destructive interference; and
    means for shifting the signal samples stored in the processing memory by a predetermined number of signal samples towards the exit side of the processing memory, so that at the exit side of the processing memory the predetermined number of signal samples are discarded, and adding a corresponding number of signal samples, that have been obtained in order, on the entry side of the processing memory, wherein the predetermined number of signal samples corresponds to a length in the time domain that is smaller than the length of the first unit of transmission.

11. The apparatus according to claim 10, wherein the length of the processing memory corresponds to more than two times the length of the first unit of transmission.

12. The apparatus according to claim 10, wherein the length of the processing memory corresponds to less than or equal to three times the length of the first unit of transmission.

13. The apparatus according to claim 10, further comprising:
 means for storing, if one of the one or more of the other replicas located by the means for locating one or more replicas of the same packet is not fully stored in the processing memory, decoded data of the decoded replica in a memory; and
 means for cancelling interference by the respective one of the other replicas when the respective one of the other replicas is fully stored in the processing memory after one or more operations of the discarding of the predetermined number of signal samples.

14. The apparatus according to claim 10, wherein the means for sequentially scanning the processing memory comprises:
 means for performing identification of replicas in the processing memory;
 means for locating, for at least one of identified replicas, one or more other replicas of the same packet using the signaling information included the identified replica; and
 means for subtracting the one or more other replicas of the same packet from the signal samples stored in the processing memory.

15. The apparatus according to claim 14,
 wherein the means for performing identification of replicas comprises means for successively applying a first correlator to groups of signal samples stored in the processing memory; and
 wherein the first correlator yields a degree of correlation between the groups of signal samples and an acquisition bit sequence included in each of the replicas.

16. The apparatus according to claim 15, further comprising means for estimating at least one of a carrier frequency, a carrier phase, a signal amplitude and a symbol clock timing from the acquisition bit sequence of the identified replica.

17. The apparatus according to claim 14, wherein the means for subtracting comprises:
 means for re-generating the one or more other replicas at the signal sample level; and
 means for subtracting the successfully detected packet and the re-generated one or more other replicas from the signal samples stored in the processing memory.

18. The apparatus according to claim 14, wherein the means for subtracting comprises:
 means for re-generating the one or more other replicas at the signal sample level;
 means for correlating the one or more re-generated other replicas with groups of signal samples stored in the processing memory at the one or more locations indicated by the signaling information;
 means for determining at least one of a carrier frequency, a carrier phase, a signal amplitude and a symbol clock timing using a result of the correlation;
 means for adjusting the re-generated one or more other replicas in accordance with the determined at least one of the carrier frequency, the carrier phase, the signal amplitude and the symbol clock timing; and
 means for subtracting the adjusted re-generated one or more other replicas from the signal samples stored in the processing memory.

19. A method of recovering data packets transmitted over a transmission channel shared by a plurality of transmitters by the method according to claim 1, the method comprising:
 a) storing signal samples obtained in order from a received signal in a processing memory which is of FIFO type and which has an entry side and an exit side, wherein a length of the processing memory corresponds to a length in the time domain that is larger than the length of the first unit of transmission;
 b) sequentially scanning the processing memory for identifying and decoding replicas in the processing memory that are not affected by destructive collisions with replicas of other packets, locating other replicas of the same packet by using the signaling information included in the decoded replicas, performing interference cancellation by cancelling the current packet and the located other replicas from the processing memory, and identifying and decoding other replicas which, after the interference cancellation, are no longer affected by destructive interference;
 c) shifting the signal samples stored in the processing memory by a predetermined number of signal samples towards the exit side of the processing memory, so that at the exit side of the processing memory the predetermined number of signal samples are discarded, and adding a corresponding number of signal samples, that have been obtained in order, on the entry side of the processing memory, wherein the predetermined number of signal samples corresponds to a length in the time domain that is smaller than the length of the first unit of transmission; and
 d) performing b) again on the signal samples stored in the processing memory after performing c).

20. The method according to claim 19, wherein the length of the processing memory corresponds to more than two times the length of the first unit of transmission.

21. The method according to claim 19, wherein the length of the processing memory corresponds to less than or equal to three times the length of the first unit of transmission.

22. The method according to claim 19, further comprising:
 storing, if one of the one or more other replicas located in b) is not fully stored in the processing memory, decoded data of the decoded replica in a memory and cancelling interference by the respective one of the other replicas when the respective one of the other replicas is fully stored in the processing memory after one or more executions of d).

23. The method according to claim 19, wherein b) comprises:
 b1) performing identification of replicas in the processing memory;
 b2) for at least one of identified replicas, locating one or more other replicas of the same packet using the signaling information included in the identified replica; and
 b3) subtracting the one or more other replicas of the same packet from the signal samples stored in the processing memory.

24. The method according to claim 23,
 wherein in b1), identification of replicas is performed by successively applying a first correlator to groups of signal samples stored in the processing memory; and wherein the first correlator yields a degree of correlation between the groups of signal samples and an acquisition bit sequence included in each of the replicas.

25. The method according to claim 24, further comprising:
estimating at least one of a carrier frequency, a carrier phase, a signal amplitude and a symbol clock timing from the acquisition bit sequence of the identified replica.

26. The method according to claim 23, further comprising:
repeating b1) to b3) until a predetermined number of iterations is reached.

27. The method according to claim 23, wherein b3) further comprises:
re-generating the one or more other replicas at the signal sample level; and
subtracting the successfully detected packet and the re-generated one or more other replicas from the signal samples stored in the processing memory.

28. The method according to claim 23, wherein b3) further comprises:
re-generating the one or more other replicas at the signal sample level;
correlating the one or more re-generated other replicas with groups of signal samples stored in the processing memory at the one or more locations indicated by the signaling information;
determining at least one of a carrier frequency, a carrier phase, a signal amplitude and a symbol clock timing using a result of the correlation;
adjusting the re-generated one or more other replicas in accordance with the determined at least one of the carrier frequency, the carrier phase, the signal amplitude and the symbol clock timing; and
subtracting the adjusted re-generated one or more other replicas from the signal samples stored in the processing memory.

29. A system of a plurality of transmitters sharing a transmission channel, wherein transmission proceeds on the basis of a first unit of transmission of fixed length that is subdivided into a plurality of second units of transmission of fixed length, each of the transmitters comprising:
means for associating, for each packet to be transmitted at least two replicas with respective second units of transmission within a current first unit of transmission;
means for generating the at least two replicas, wherein in each of the two replicas signaling information is included, the signaling information indicating relative positions of the other replicas of the same packet within the current first unit of transmission with respect to a given replica;
means for setting a start timing for beginning transmission of the current first unit of transmission independently of the other transmitters of the plurality of transmitters sharing the transmission channel; and
means for transmitting the at least two replicas at respective timings in accordance with their association with the respective second units of transmission within the current first unit of transmission,
wherein the start timing is set such that there may occur a situation in which, at a time of reception at shared receiver associated with the communication channel, an offset in the time domain between a first unit of transmission transmitted by a first transmitter of the plurality of transmitters and a first unit of transmission transmitted by a second transmitter of the plurality of transmitters is not an integer multiple of the length of the first unit of transmission.

30. The system according to claim 29, wherein the start timing is set a predetermined or random duration after generation of the at least two replica by the means for generating the at least two replica has been completed.

31. The system according to claim 29, wherein the start timing is set without synchronization with a shared receiver associated with the communication channel.

32. The system according to claim 29, wherein the signaling information indicates the relative positions of the other replicas of the same packet with respect to the given replica in terms of an integer number of second units of transmission.

33. The system according to claim 29, wherein exactly two replicas are generated of each packet to be transmitted.

34. The system according to claim 29,
wherein each of the transmitters further comprises means for setting a power of transmission for the current first unit of transmission in accordance with a randomization scheme; and
wherein the means for transmission transmits all generated replicas that are associated with second units of transmission of the current first unit of transmission in accordance with the power of transmission.

35. The system according to claim 29,
wherein each of the transmitters further comprises means for setting, for each of the generated replicas, a power of transmission in accordance with a randomization scheme, so that when there are Nrep generated replicas, Nrep independent powers of transmission are set; and
wherein the means for transmission transmits each of the Nrep generated replicas in accordance with the respective one of the Nrep independent powers of transmission.

36. The system according to claim 29, wherein a first one of the two or more replica is associated with the earliest second unit of transmission within the current first unit of transmission.

37. The system according to claim 29, wherein a first one of the two or more replica is associated with a second unit of transmission within the current first unit of transmission in accordance with a congestion control policy.

38. A transmitter for use in the system according to claim 29.

* * * * *